United States Patent
Motegi et al.

(10) Patent No.: US 12,154,339 B2
(45) Date of Patent: Nov. 26, 2024

(54) EXHIBITION SUPPORT DEVICE, EXHIBITION SUPPORT SYSTEM, EXHIBITION SUPPORT METHOD, AND PROGRAM

(71) Applicant: NIPPON TELEGRAPH AND TELEPHONE CORPORATION, Tokyo (JP)

(72) Inventors: Manabu Motegi, Tokyo (JP); Sayaka Teranaka, Tokyo (JP); Akiko Hayashi, Tokyo (JP); Shunsuke Takamiya, Tokyo (JP); Masafumi Suzuki, Tokyo (JP); Yukihiro Nakamura, Tokyo (JP); Tatsuya Matsui, Tokyo (JP); Satoshi Sakuma, Tokyo (JP); Shingo Kinoshita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 462 days.

(21) Appl. No.: 17/609,708

(22) PCT Filed: May 9, 2019

(86) PCT No.: PCT/JP2019/018529
§ 371 (c)(1),
(2) Date: Nov. 8, 2021

(87) PCT Pub. No.: WO2020/225899
PCT Pub. Date: Nov. 12, 2020

(65) Prior Publication Data
US 2022/0222942 A1    Jul. 14, 2022

(51) Int. Cl.
*G06V 20/50*    (2022.01)
*G10L 13/02*    (2013.01)

(52) U.S. Cl.
CPC .............. *G06V 20/50* (2022.01); *G10L 13/02* (2013.01)

(58) Field of Classification Search
None
See application file for complete search history.

(56) References Cited

U.S. PATENT DOCUMENTS

| | | | |
|---|---|---|---|
| 6,055,536 A | 4/2000 | Shimakawa et al. | |
| 2016/0203643 A1* | 7/2016 | Kim | G06T 19/003 345/633 |
| 2016/0212591 A1* | 7/2016 | Kim | H04W 4/029 |
| 2018/0232799 A1* | 8/2018 | Kitagawa | G06Q 30/0623 |

FOREIGN PATENT DOCUMENTS

| | | | |
|---|---|---|---|
| JP | 2004015448 A | 1/2004 | |
| JP | 2006215883 A | 8/2006 | |
| JP | 2009223408 A | 10/2009 | |

\* cited by examiner

Primary Examiner — Dov Popovici

(57) ABSTRACT

An exhibition supporting device 110 includes a recognition result information acquisition unit 1112 configured to acquire recognition result information on a display item in accordance with image information on the display item, an exhibition information acquisition unit 1114 configured to acquire exhibition information in accordance with the recognition result information and exhibition-related user information, and a display unit 114 configured to display the exhibition information.

19 Claims, 19 Drawing Sheets

EXHIBITION SUPPORT DEVICE, EXHIBITION SUPPORT SYSTEM, EXHIBITION SUPPORT METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/018529, filed on 9 May 2019, the disclosure of which is hereby incorporated herein by reference in its entirety.

TECHNICAL FIELD

The present invention relates to an exhibition supporting device, an exhibition supporting system, an exhibition supporting method, and a program.

BACKGROUND ART

In recent years, due to widespread uses of smartphones and tablet personal computers (PCs), there have been more users enjoying exhibitions through their terminal devices in which a guidance application or the like is installed.

In this context, Patent Literature (PTL) 1 discloses an information collection system enabling a visitor of an exhibition to collect information about desired references without going through cumbersome operation. Specifically, the information can be received by receiving, from a communication electrode installed in each exhibition booth, reference request information using a collection device held by the user.

CITATION LIST

Patent Literature

PTL1: JP 2009-223408 A

SUMMARY OF THE INVENTION

Technical Problem

Unfortunately, many related-art systems have simply delivered information that does not go beyond what is already provided in a paper brochure or posted on a website for the exhibition to the user. As a result, a user visiting the exhibition might be unable to acquire the information he or she needs. Thus, the user is likely to feel the exhibition unsatisfactory. Further, the communication electrode, which is not a display item, needs to be installed in an exhibition booth. This is cumbersome, and may even compromise the appearance.

An object of the present invention made in view of the above is to provide an exhibition supporting device, an exhibition supporting system, an exhibition supporting method, and a program that can make an exhibition experience more engaging for a user without compromising the appearance of display items.

Means for Solving the Problem

In order to solve the problems described above, an exhibition supporting device according to the present invention includes a recognition result information acquisition unit configured to acquire recognition result information on a display item in accordance with image information on the display item, an exhibition information acquisition unit configured to acquire exhibition information for supporting an exhibition-related user action in accordance with the recognition result information and exhibition-related user information, and a display unit configured to display the exhibition information.

In order to solve the problems described above, an exhibition supporting system according to the present invention includes an image recognition engine configured to determine recognition result information on a display item in accordance with image information on the display item, an exhibition information server configured to generate exhibition information for supporting an exhibition-related user action in accordance with the recognition result information and exhibition-related user information, and a terminal device configured to display the exhibition information.

In order to solve the problems described above, an exhibition supporting method according to the present invention includes acquiring recognition result information on a display item in accordance with image information on the display item, acquiring exhibition information for supporting an exhibition-related user action in accordance with the recognition result information and exhibition-related user information, and displaying the exhibition information.

To solve the problems described above, a program according to the present invention causes a computer to function as the above-described exhibition supporting device.

Effects of the Invention

The present invention can make an exhibition experience more engaging for a user without compromising the appearance of display items.

DESCRIPTION OF EMBODIMENTS

Figure 1:
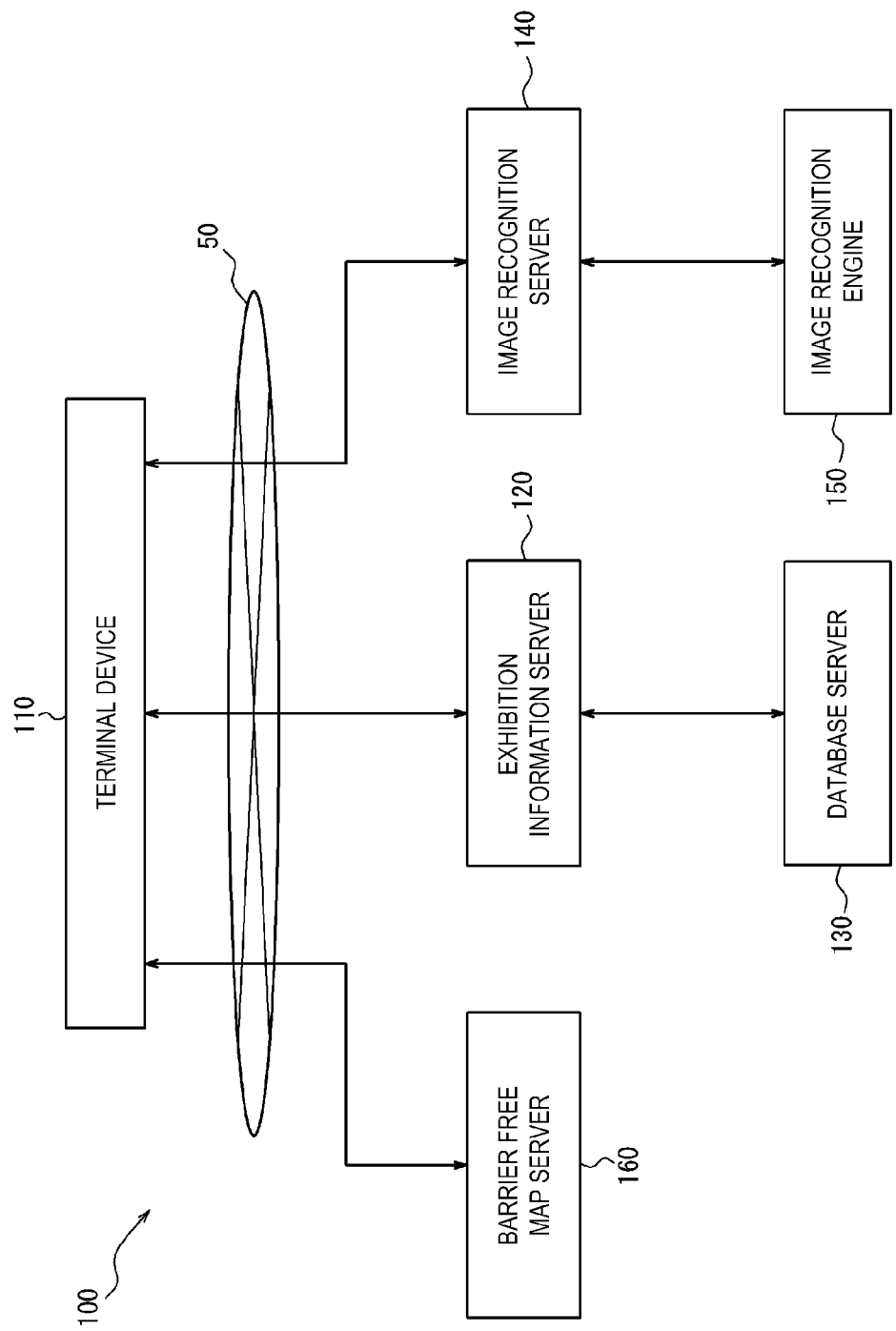
FIG. 1 is a diagram illustrating an example of a configuration of an exhibition supporting system according to an embodiment of the present invention.

Hereinafter, an embodiment of the present invention will be described in detail with reference to the drawings.
Configuration of Exhibition Supporting System 100
An exhibition supporting system 100 according to the present embodiment will be described with reference to FIG. 1. FIG. 1 is a diagram illustrating an example of a configuration of the exhibition supporting system 100 according to the present embodiment.

As illustrated in FIG. 1, the exhibition supporting system 100 includes a terminal device (exhibition supporting device) 110, an exhibition information server 120, a database server 130, an image recognition server 140, an image recognition engine 150, and a barrier free map server 160. The terminal device 110 communicates with the exhibition information server 120, the image recognition server 140, and the barrier free map server 160 over a network 50.

The terminal device 110 is a mobile terminal held by a user and includes, for example, a smart device such as a smart phone or a tablet PC. The user is a person, including for example, a healthy person, an elderly person, a handicapped person using a wheelchair, and the like, all enjoying an exhibition using a predetermined application and the like installed in the terminal device 110.

For example, the terminal device 110 acquires display item image information using a camera, and transmits the display item image information to the image recognition server 140 over the network 50. The terminal device 110 receives display item recognition result information in accordance with the display item image information, from the image recognition server 140 over the network 50. The display item recognition result information is identification information set to each display item, and includes, for example, a recognition result ID of the display item.

The terminal device 110 transmits the display item recognition result information to the exhibition information server 120 over the network 50. The terminal device 110 receives, from the exhibition information server 120 over the network 50, exhibition information in accordance with the display item recognition result information and exhibition-related user information.

The exhibition-related user information is information in which identification information on the terminal device 110 and exhibition-related edit information are associated with each other. The identification information on the terminal device 110 is identification information set to each terminal device 110, and is, for example, a universally unique identifier (UUID) of the terminal device 110.

The exhibition-related edit information is various types of information on the exhibition, provided in response to a predetermined operation on the terminal device 110 performed by the user. For example, exhibition-related edit information includes display item bookmark registration information, exhibition report information, speaker information, display item tag information, display item text comment information, and the like. The display item bookmark registration information is information provided in response to a bookmark registration operation performed on the terminal device 110 by the user. The exhibition report information is information provided in response to a report generation operation performed on the terminal device 110 by the user. The speaker information is information on a speaker who provides synthesized voice explaining an overview of a display item, provided in response to a selection operation performed on the terminal device 110 by the user. The display item tag information is information provided in response to a tag selection operation performed on the terminal device 110 by the user. The display item text comment information is information provided in response to a text comment input operation performed on the terminal device 110 by the user.

The exhibition information is information for supporting various types of actions of the user related to the exhibition, including "find display item", "go to displayed area", "listen to descriptions at exhibition booth", "create notes on display item", and "share information after leaving exhibition". For example, the exhibition information may include whole exhibition list information as a list of all the display items displayed in the exhibition. The exhibition information may further include detail exhibition information including display item overview information, map information in which locations of display items in the exhibition site and a floor map of the exhibition site are associated with each other, panel information on display items, and the like. The exhibition information may further include site map information indicating the location of the exhibition site where the exhibition is held. The exhibition information may further include transportation information indicating means of transportation available to get to the exhibition site from the closest station to the exhibition site where the exhibition is held.

The terminal device 110 sends to, the barrier free map server 160 over the network 50, current position information indicating the current position of the user in the exhibition site and destination information indicating a location where the user wants to go in the exhibition site. The terminal device 110 receives barrier free information from the barrier free map server 160 over the network 50 in accordance with the current position information and the destination information. The barrier free information is information for supporting various types of actions of users with disabilities.

For example, the barrier free information includes route map information in which a 2.5 dimensional map of the exhibition site and a movement route along which a handicapped person on a wheelchair is movable in the exhibition site.

The terminal device 110 displays the exhibition information and the barrier free information as described above. The terminal device 110 further displays lecture information including a schedule of lectures held in the exhibition, names of the lecturers, affiliations of the lecturers, and the like. The terminal device 110 displays the exhibition report information.

The terminal device 110 plays synthesized voice information on a predetermined speaker (such as a speaker 1 and a speaker 2, for example) explaining an overview of a display item. The terminal device 110 selects the synthesized voice information on the predetermined speaker from among pieces of synthesized voice information on a plurality of speakers in response to a selection operation performed by the user.

The exhibition information server 120 receives an exhibition information request from the terminal device 110 over the network 50. Upon receiving the exhibition information request from the terminal device 110, the exhibition information server 120 generates exhibition information in accordance with the display item recognition result information and the exhibition-related user information. The exhibition information server 120 is capable of acquiring and using information about a display item posted on the website for the exhibition for example, from a predetermined server over the network 50, for generating the exhibition information. The exhibition information server 120 transmits the generated exhibition information to the terminal device 110 over the network 50. The exhibition information server 120 also transmits and receives information such as the display item image information, the display item recognition result information, and the exhibition-related user information, to and from the database server 130.

The database server 130 accumulates the exhibition-related user information. The database server 130 manages the identification information on the terminal device 110 and the exhibition-related edit information, in association with each other. For example, the database server 130 manages the identification information on the terminal device 110 and the display item bookmark registration information provided in response to a bookmark registration operation performed on the terminal device 110 by the user, in association with each other. For example, the database server 130 manages the identification information on the terminal device 110 and the exhibition report information provided in response to a report generation operation performed on the terminal device 110 by the user, in association with each other. For example, the database server 130 manages the identification information on the terminal device 110 and the information on a speaker who provides synthesized voice explaining an overview of the display item provided in response to a selection operation performed on the terminal device 110 by the user, in association with each other. For example, the database server 130 manages the identification information on the terminal device 110 and input information (such as display item tag information, display item text comment information, and exhibition statistical information) provided in response to an input operation performed on the terminal device 110 by the user, in association with each other.

The image recognition server 140 receives the display item image information from the terminal device 110 over the network 50, and transmits the display item image information to the image recognition engine 150. The image recognition server 140 receives the display item recognition result information from the image recognition engine 150, and transmits the display item recognition result information to the terminal device 110 over the network 50.

The image recognition engine 150 receives the display item image information from the image recognition server 140. The image recognition engine 150 compares the display item image information received from the image recognition server 140 with display item image information registered in advance, to determine the display item recognition result information. The image recognition engine 150 transmits the display item recognition result information thus determined to the image recognition server 140. Various types of display item image information, various types of display item recognition result information, and the like are registered in the image recognition engine 150 in advance.

The barrier free map server 160 receives the current position information and destination information from the terminal device 110 over the network 50. The barrier free map server 160 generates the barrier free information in accordance with the current position information and the destination information. The barrier free map server 160 transmits the barrier free information to the terminal device 110 over the network 50.

In the exhibition supporting system 100 according to the present embodiment, the image recognition engine 150 determines display item recognition result information in accordance with the display item image information. The exhibition information server 120 generates the exhibition information in accordance with the display item recognition result information and the exhibition-related user information. The terminal device 110 displays the exhibition information. In this way, the user can take various types of actions including, for example, "find display item", "go to displayed area", "listen to descriptions at exhibition booth, "create notes on display item", "share information after leaving exhibition", and the like, while checking the information he or she needs displayed on the screen of the terminal device 110. Thus, the exhibition supporting system 100 can be implemented to make the exhibition experience more engaging for the user, by avoiding problems occurring in related-art systems due to information needed by the user not displayed on the screen of his or her terminal device 110. Examples of such problems include: a display item the user is interested in in the exhibition site is difficult to find; and the user has to wait for a long period of time to listen to the explanation from a docent at an exhibition booth where the display item he or she is interested in is placed due to congestion or the like.

Furthermore, with the exhibition supporting system 100 according to the present embodiment, no equipment other than display items, such as a QR code or a communication electrode, needs to be installed in the exhibition booth, unlike in related-art cases. Thus, a workload and operation cost for the organizer of the exhibition to install equipment other than the display items in the exhibition booth can be reduced. Thus, the exhibition experience can be more engaging not only for the user of the exhibition but also for the organizer of the exhibition. Furthermore, appropriate information can be provided to the user without installing additional equipment to exhibition booths, so that the appearance of the display items can be maintained.

Configuration of Terminal Device 110

The terminal device 110 according to the present embodiment will be described in detail with reference to FIG. 2.

Figure 2:
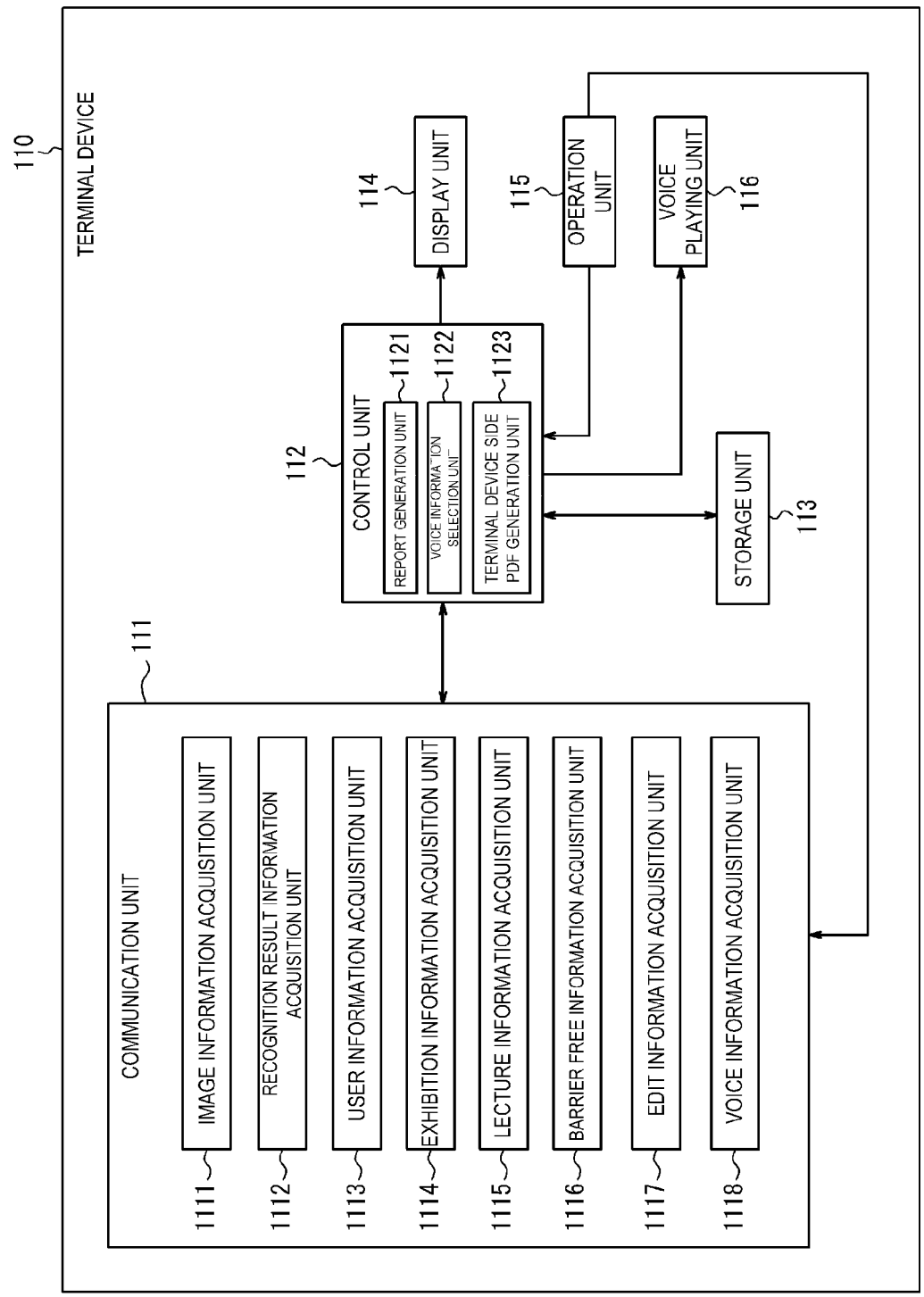
FIG. 2 is a block diagram illustrating an example of a configuration of an exhibition supporting device according to an embodiment of the present invention.

FIG. 2 is a diagram illustrating an example of a configuration of the terminal device 110 according to the present embodiment.

As illustrated in FIG. 2, the terminal device 110 includes a communication unit 111, a control unit 112, a storage unit 113, a display unit 114, an operation unit 115, and a voice playing unit 116.

The communication unit 111 includes an image information acquisition unit 1111, a recognition result information acquisition unit 1112, a user information acquisition unit 1113, an exhibition information acquisition unit 1114, a lecture information acquisition unit 1115, a barrier free information acquisition unit 1116, an edit information acquisition unit 1117, and a voice information acquisition unit 1118.

The communication unit 111 communicates with the exhibition information server 120, the image recognition server 140, and the barrier free map server 160 over the network 50. The communication unit 111 outputs information received from these servers to the control unit 112 over the network 50. The communication unit 111 transmits various types of information input from the control unit 112, to these servers over the network 50.

The image information acquisition unit 1111 acquires display item image information from a camera mounted on the terminal device 110, for example. The recognition result information acquisition unit 1112 acquires the display item recognition result information in accordance with the display item image information. The user information acquisition unit 1113 acquires the exhibition-related user information in accordance with the display item-related edit information. The exhibition information acquisition unit 1114 acquires the exhibition information in accordance with the display item recognition result information and the exhibition-related user information. The lecture information acquisition unit 1115 acquires lecture information in accordance with the display item recognition result information. The barrier free information acquisition unit 1116 acquires the barrier free information in accordance with the current position information and the destination information. The edit information acquisition unit 1117 acquires the display item edit information corresponding to an operation performed on the operation unit 115 by the user. The voice information acquisition unit 1118 acquires synthesized voice information on a plurality of speakers in accordance with the display item recognition result information and the exhibition information.

The control unit 112 includes a report generation unit 1121, a voice information selection unit 1122, and a terminal device side PDF generation unit 1123. The control unit 112 includes, for example, a CPU, a memory, and the like, and controls each part of the terminal device 110.

The control unit 112 outputs various types of information to the display unit 114, and causes the display unit 114 to display a predetermined screen. The control unit 112 causes the display unit 114 to display, for example, an initial screen 3110 (see FIG. 5), a whole exhibition list screen 3120 (see FIG. 6), a site map screen 3130 (see FIG. 7), a barrier free route guidance screen 3140 (see FIG. 8), an exhibition detail overview screen 3150A (see FIG. 9A), an exhibition detail map screen 3150B (see FIG. 9B), an exhibition detail panel screen 3150C (see FIG. 9C), a speaker introduction voice playing screen 3160 (see FIG. 10), a shooting screen 3170 (see FIG. 11), a speaker selection screen 3180 (see FIG. 12), a report generation screen 3190 (see FIG. 13), a shooting screen 3210A (see FIG. 14A), a report input screen 3210B (see FIG. 14B), a report display screen 3220 (see FIG. 15), and the like. The control unit 112 can also appropriately set a language (for example, Japanese, English, or the like) for a predetermined screen displayed on the display unit 114.

The report generation unit 1121 generates report information in accordance with the display item image information, the exhibition-related user information, the display item edit information, report HTML information, the exhibition information, PDF file information, and the like. The report generation unit 1121 outputs the report information to the display unit 114. The report generation unit 1121 stores the report information in the storage unit 113. While a case where the report information is displayed on the display unit 114 of the terminal device 110 is described as an example in the present embodiment, the report information may be displayed on the display unit 114 of the terminal device 110 and then printed on a sheet of paper.

For example, when the terminal device 110 is a high-spec device (with the OS being a predetermined version or later, for example), the report generation unit 1121 receives the PDF file information from the terminal device side PDF generation unit 1123 of the terminal device 110. For example, when the terminal device 110 is a low-spec device (with the OS being earlier than the predetermined version, for example), the report generation unit 1121 receives the PDF file information from an exhibition information server side PDF generation unit 1223 (see FIG. 3) of the exhibition information server 120.

The voice information selection unit 1122 selects synthesized voice information on a predetermined speaker corresponding to an operation performed on the operation unit 115 by the user, in accordance with the synthesized voice information on the plurality of speakers input from the voice information acquisition unit 1118, the user information input from the user information acquisition unit 1113, and the like. The voice information selection unit 1122 stores the synthesized voice information on the predetermined speaker in the storage unit 113. The control unit 112 outputs the synthesized voice information on the predetermined speaker stored in the storage unit 113 to the voice playing unit 116.

The terminal device side PDF generation unit 1123 converts the report HTML information into PDF file information in accordance with PDF generation determination result information, a PDF generation request, report HTML information, and the like. The terminal device side PDF generation unit 1123 outputs the PDF file information to the report generation unit 1121. The terminal device side PDF generation unit 1123 outputs the PDF file information to the storage unit 113.

When the terminal device 110 is a high-spec device, the terminal device side PDF generation unit 1123 receives determination result information indicating the PDF file information is to be generated by the terminal device 110, from a PDF generation determination unit 1222 (see FIG. 3) of the exhibition information server 120. When the terminal device 110 is a low-spec device, the terminal device side PDF generation unit 1123 receives determination result information indicating the PDF file information is not to be generated by the terminal device 110, from the PDF generation determination unit 1222 (see FIG. 3) of the exhibition information server 120.

The storage unit 113 may be any component such as hard disk drive having a function of storing information, for example. For example, the storage unit 113 stores the display item image information, the display item recognition result information, the exhibition-related user information, the exhibition information, the lecture information, the barrier free information, the exhibition-related edit information, the synthesized voice information on a plurality of speakers, and the like. For example, the storage unit 113 stores the report information, the PDF file information, the synthesized voice information on a predetermined speaker corresponding to an operation performed on the operation unit 115 by the user, synthesized voice information on a plurality of speakers recorded in advance, and the like. For example, the storage unit 113 stores various programs, data, and the like, in addition to the above.

The display unit 114 may be any device that can display images, characters, and the like, and includes, for example, a liquid crystal display, an organic electro-luminescence (EL) display, and the like. The display unit 114 displays a predetermined screen in accordance with various types of information input from the control unit 112.

The display unit 114 displays, for example, the initial screen 3110 (see FIG. 5), the whole exhibition list screen 3120 (see FIG. 6), the site map screen 3130 (see FIG. 7), the barrier free route guidance screen 3140 (see FIG. 8), the exhibition detail overview screen 3150A (see FIG. 9A), the exhibition detail map screen 3150B (see FIG. 9B), the exhibition detail panel screen 3150C (see FIG. 9C), the speaker introduction voice playing screen 3160 (see FIG. 10), the shooting screen 3170 (see FIG. 11), the speaker selection screen 3180 (see FIG. 12), the report generation screen 3190 (see FIG. 13), the shooting screen 3210A (see FIG. 14A), the report input screen 3210B (see FIG. 14B), the report display screen 3220 (see FIG. 15), and the like.

The operation unit 115 may be any device that enables a user to perform predetermined operations, including a touch panel or a software keyboard, for example. The user can use the operation unit 115 to perform a predetermined operation to perform actions including bookmarking a display item the user is interested in, generating a report on the exhibition, selecting a favorite speaker, selecting a tag of a display item the user is interested in, inputting a text comment for a display item the user is interested in, and creating a memo on a display item the user is interested in, for example.

The voice playing unit 116 plays synthesized voice explaining an overview of a display item in accordance with the display item image information, the exhibition information, the synthesized voice information on a predetermined speaker input from the control unit 112, and the like. This allows the user to listen to an overview of the display item he or she is interested in that is provided by the synthesized voice of his or her favorite speaker.

Configuration of Exhibition Information Server 120

Figure 3:
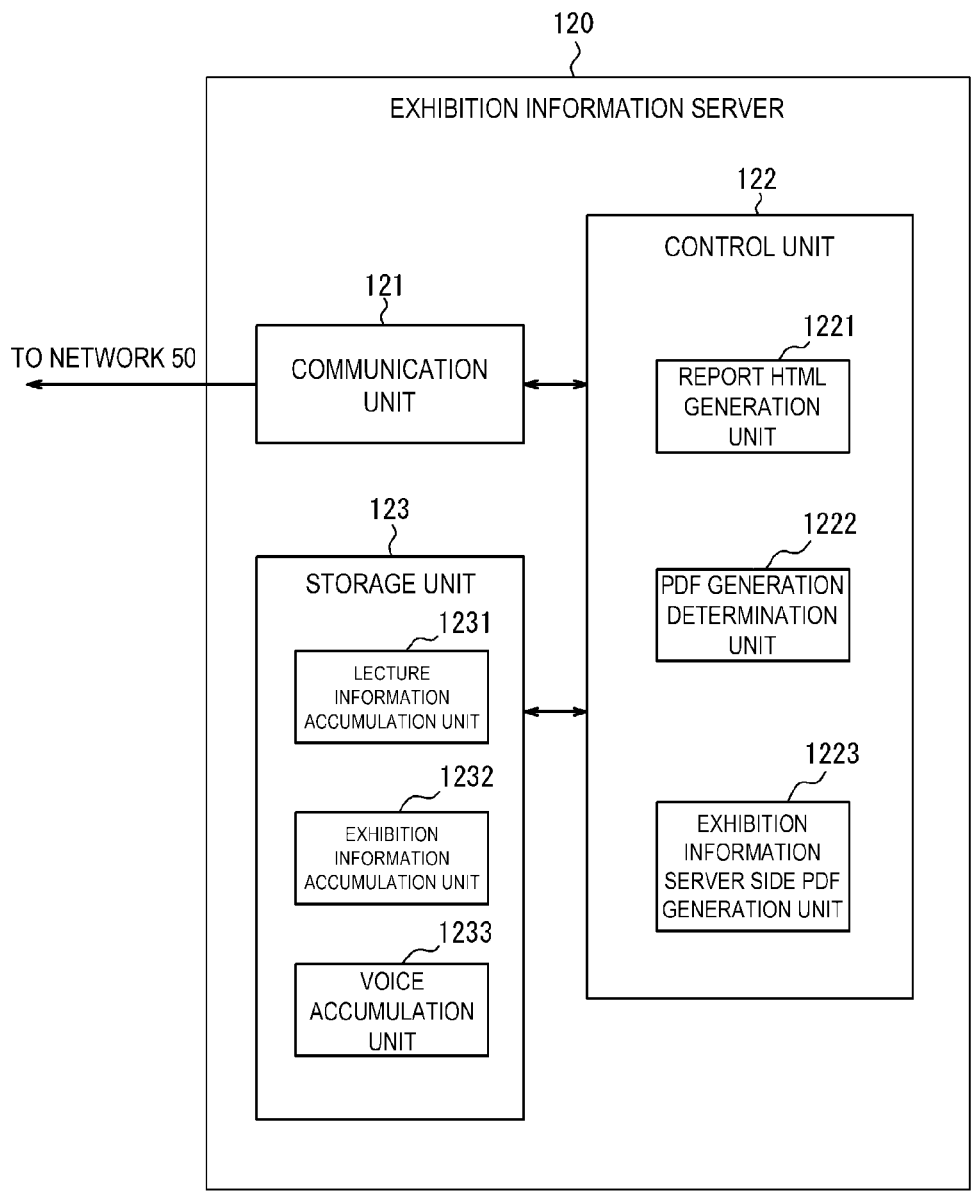
FIG. 3 is a block diagram illustrating an example of a configuration of an exhibition information server according to an embodiment of the present invention.

The exhibition information server 120 according to the present embodiment will be described in detail with reference to FIG. 3. FIG. 3 is a diagram illustrating an example of a configuration of the exhibition information server 120 according to the present embodiment.

As illustrated in FIG. 3, the exhibition information server 120 includes a communication unit 121, a control unit 122, and a storage unit 123.

The communication unit 121 communicates with the terminal device 110 over the network 50. The communication unit 121 outputs various types of information received from the terminal device 110, to the control unit 122. The communication unit 121 transmits various types of information input from the control unit 122, to the terminal device 110 over the network 50.

The communication unit 121 receives, from the terminal device 110, information such as, for example, a report HTML generation request, the PDF generation request, user agent information, the display item image information, the display item recognition result information, and the exhibition-related edit information, over the network 50. For example, the communication unit 111 transmits, to the terminal device 110, for example, information such as report HTML information, PDF generation determination result information, PDF generation request, PDF file information, and exhibition information, over the network 50.

The control unit 122 includes a report HTML generation unit 1221, the PDF generation determination unit 1222, and the exhibition information server side PDF generation unit 1223. The control unit 122 includes, for example, a CPU, a memory, and the like, and controls each part of the exhibition information server 120.

The report HTML generation unit 1221 generates the report HTML information in accordance with the report HTML generation request, the display item image information, the exhibition-related user information, the display item edit information, the exhibition information, and the like. The report HTML generation unit 1221 stores the report HTML information in the storage unit 123.

The report HTML generation unit 1221 outputs the report HTML information to the terminal side PDF generation unit 1123 of the terminal device 110 or the exhibition information server side PDF generation unit 1223 of the exhibition information server 120. For example, when the PDF generation determination unit 1222 determines that the terminal device 110 is a high-spec device, the report HTML generation unit 1221 outputs the report HTML information to the terminal side PDF generation unit 1123 of the terminal device 110, because the PDF file information is generated by the terminal device 110. For example, when the PDF generation determination unit 1222 determines that the terminal device 110 is a low-spec device, the report HTML generation unit 1221 outputs the report HTML information to the exhibition information server side PDF generation unit 1223 of the exhibition information server 120, because the PDF file information is generated by the exhibition information server 120.

The PDF generation determination unit 1222 determines a location where the PDF file information is to be generated in accordance with the PDF generation request, the user agent information, and the like. The PDF generation determination unit 1222 determines the spec of the terminal device 110 in accordance with information such as the type and the version of the OS of the terminal device 110. The PDF generation determination unit 1222 stores the PDF generation determination result information in the storage unit 123.

When the terminal device 110 is determined to be a high-spec device, the PDF generation determination unit 1222 determines that the PDF file information is to be generated by the terminal device side PDF generation unit 1123. The PDF generation determination unit 1222 outputs the PDF generation request and the PDF generation determination result information to the terminal device side PDF generation unit 1123 of the terminal device 110.

When the terminal device 110 is determined to be a low-spec device, the PDF generation determination unit 1222 determines that the PDF file information is to be generated by the exhibition information server side PDF generation unit 1223. The PDF generation determination unit 1222 outputs the PDF generation request and the PDF generation determination result information to the exhibition information server side PDF generation unit 1223 of the exhibition information server 120.

The exhibition information server side PDF generation unit 1223 converts the report HTML information into the PDF file information in accordance with the PDF generation determination result and the PDF generation request input from the PDF generation determination unit 1222, the report HTML information input from the report HTML generation unit 1221, and the like. The exhibition information server side PDF generation unit 1223 outputs the PDF file information to the communication unit 121. The exhibition information server side PDF generation unit 1223 stores the PDF file information in the storage unit 123.

The storage unit 123 may be any component such as hard disk drive having a function of storing information, for example. The storage unit 123 stores, for example, the report HTML generation request, the PDF generation request, the user agent information, the display item image information, the display item recognition result information, the exhibition-related user information, and the exhibition-related edit information. The storage unit 123 stores, for example, the report HTML information, the PDF generation determination result information, the PDF generation request, the PDF file information, and the like. For example, the storage unit 123 stores various programs, data, and the like, in addition to the above.

The storage unit 123 includes a lecture information accumulation unit 1231, an exhibition information accumulation unit 1232, and a voice information accumulation unit 1233. The lecture information accumulation unit 1231 accumulates the lecture information including the schedule of lectures held in the exhibition, the names of the lecturers, the affiliations of the lecturers, and the like, for example. The exhibition information accumulation unit 1232 accumulates the exhibition information including the whole exhibition list information, the detail exhibition information, the site map information, the transport information, and the like, for example. The voice information accumulation unit 1233 accumulates voice information including synthesized voice information on a plurality of speakers, for example. Note that the synthesized voice information on a plurality of speakers is recorded in advance.

Load Distribution Method

Figure 4:
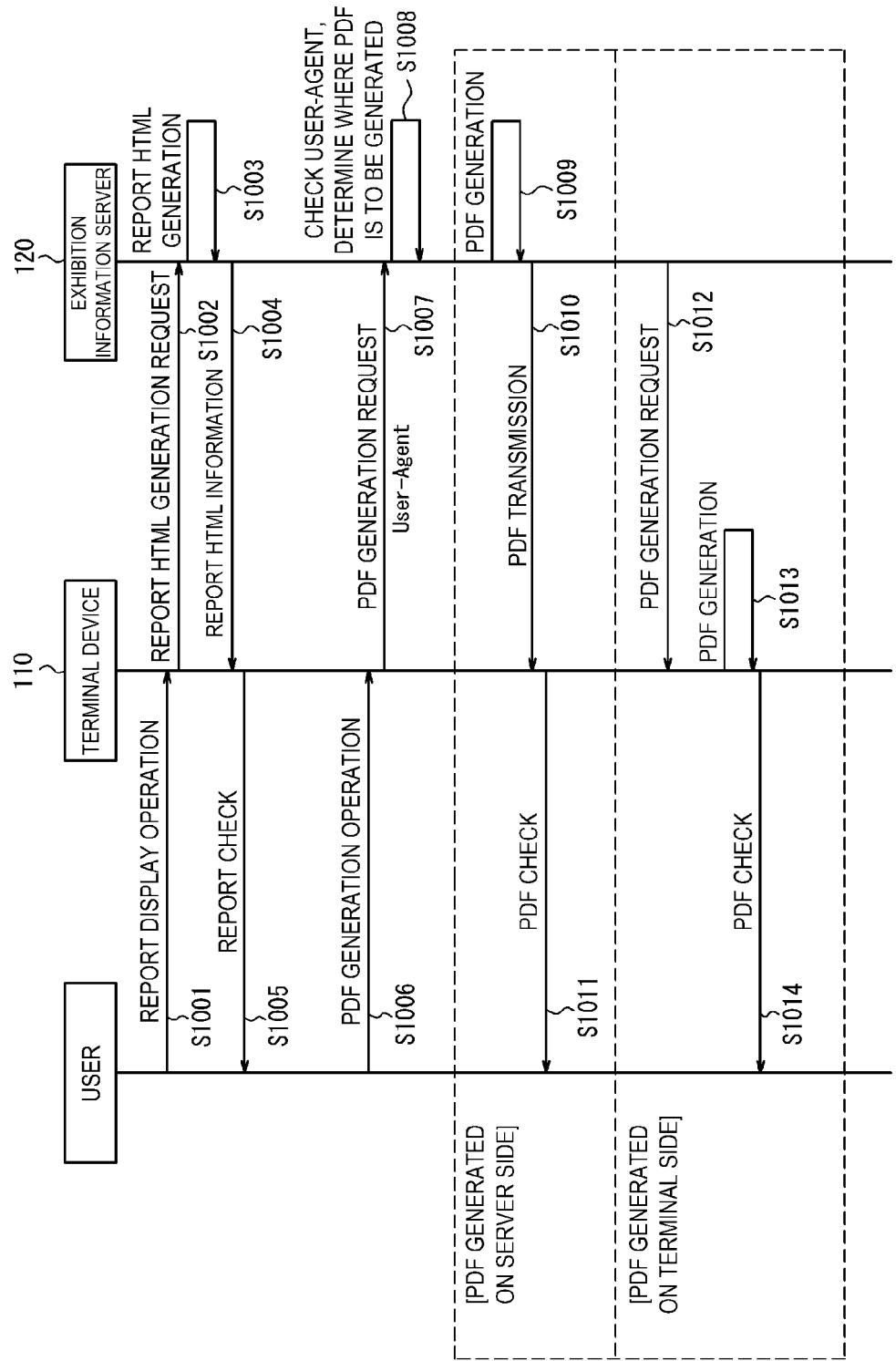
FIG. 4 is a flowchart illustrating an example of load distribution processing according to an embodiment of the present invention.

Now, an example of a load distribution processing method in the exhibition supporting system 100 according to the present embodiment will be described with reference to FIG. 4.

In step S1001, the user performs a report display operation using the operation unit 115 of the terminal device 110.

In step S1002, the terminal device 110 receives the report display operation performed by the user and transmits a report HTML generation request to the exhibition information server 120 over the network 50.

In step S1003, the exhibition information server 120 receives the report HTML generation request from the terminal device 110 over the network 50, and generates report HTML information.

In step S1004, the exhibition information server 120 transmits the report HTML information to the terminal device 110 over the network 50.

In step S1005, the terminal device 110 receives the report HTML information from the exhibition information server 120 over the network 50. The terminal device 110 displays the report information on the display unit 114 in accordance with the report HTML information or the like. The user checks the report displayed on the terminal device 110.

In step S1006, the user performs a PDF generation operation using the operation unit 115 of the terminal device 110.

In step S1007, the terminal device 110 receives the PDF generation operation performed by the user, and transmits a PDF generation request and user agent information to the exhibition information server 120 over the network 50.

In step S1008, the exhibition information server 120 checks the user agent information received together with the PDF generation request and determines where the PDF file information is to be generated in accordance with information on the type and version of the OS of the terminal device 110 and the like. Upon determining that the terminal device 110 is a high-spec device in accordance with the user agent information, the exhibition information server 120 determines the terminal device 110 to be the location where the PDF file information is generated. In this case, the processing in step S1012 is executed. Upon determining that the terminal device 110 is a low-spec device in accordance with the user agent information, the exhibition information server 120 determines the exhibition information server 120 to be the location where the PDF file information is generated. In this case, the processing in step S1009 is executed.

In step S1009, the exhibition information server 120 executes PDF generation processing and transmits the PDF file information to the terminal device 110 over the network 50.

In step S1010, the terminal device 110 receives the PDF file information from the exhibition information server 120 over the network 50.

In step S1011, the terminal device 110 displays the report information in a PDF format on the display unit 114 in accordance with the PDF file information and the like. The user checks the PDF file displayed on the terminal device 110.

In step S1012, the exhibition information server 120 transmits a PDF generation request to the terminal device 110 over the network 50.

In step S1013, the terminal device 110 executes the PDF generation processing in accordance with the PDF generation request.

In step S1014, the terminal device 110 displays the report information in a PDF format on the display unit 114 in accordance with the PDF file information and the like. The user checks the PDF file displayed on the terminal device 110.

In the load distribution processing method described above, the exhibition information server 120 determines whether the terminal device 110 is a high-spec device or a low-spec device, to make appropriate one of the terminal device 110 and the exhibition information server 120 be in charge of high load processing. This configuration can suppress an occurrence of a failure due to an excessive load on the terminal device 110 with a low processing performance, such as an extremely long processing time or abnormal termination of an application due to an error. Furthermore, the high-spec terminal device 110 generates a PDF file therein, so that a large load can be prevented from being imposed on the exhibition information server 120.

Display Screen of Display Unit

An example of the display screens of the display unit 114 in the terminal device 110 according to the present embodiment will be described with reference to FIGS. 5 to 16.

Figure 5:
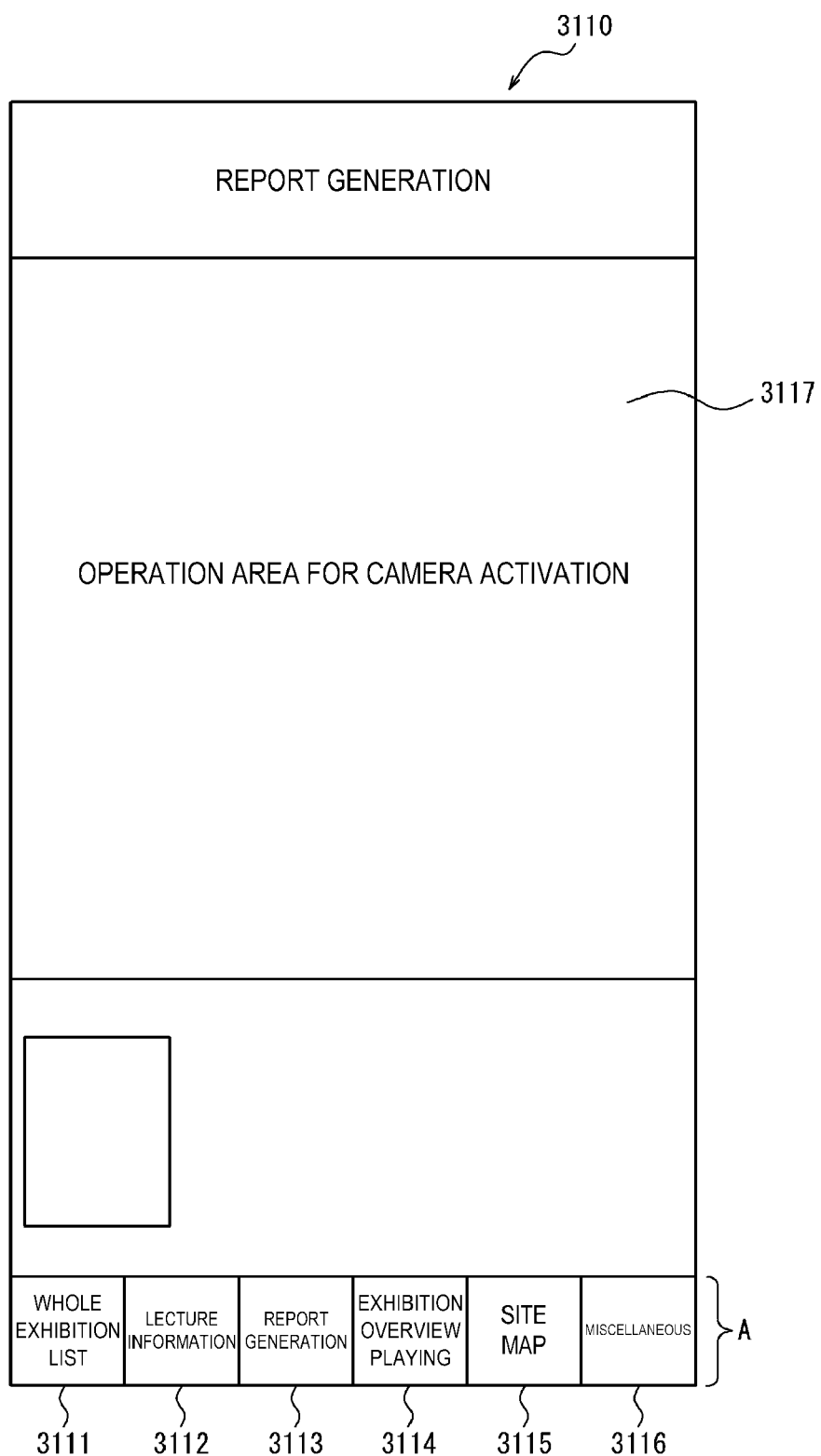
FIG. 5 is a diagram illustrating an example of a display screen of a display unit of the exhibition supporting device according to an embodiment of the present invention.

FIG. 5 is a diagram illustrating an example of the initial screen 3110. As illustrated in FIG. 5, the initial screen 3110 includes a footer menu A, an operation area 3117 for camera activation, and the like. The footer menu A includes a whole exhibition list button 3111, a lecture information button 3112, a report generation button 3113, an exhibition overview playing button 3114, a site map button 3115, a miscellaneous button 3116, and the like.

Figure 6:
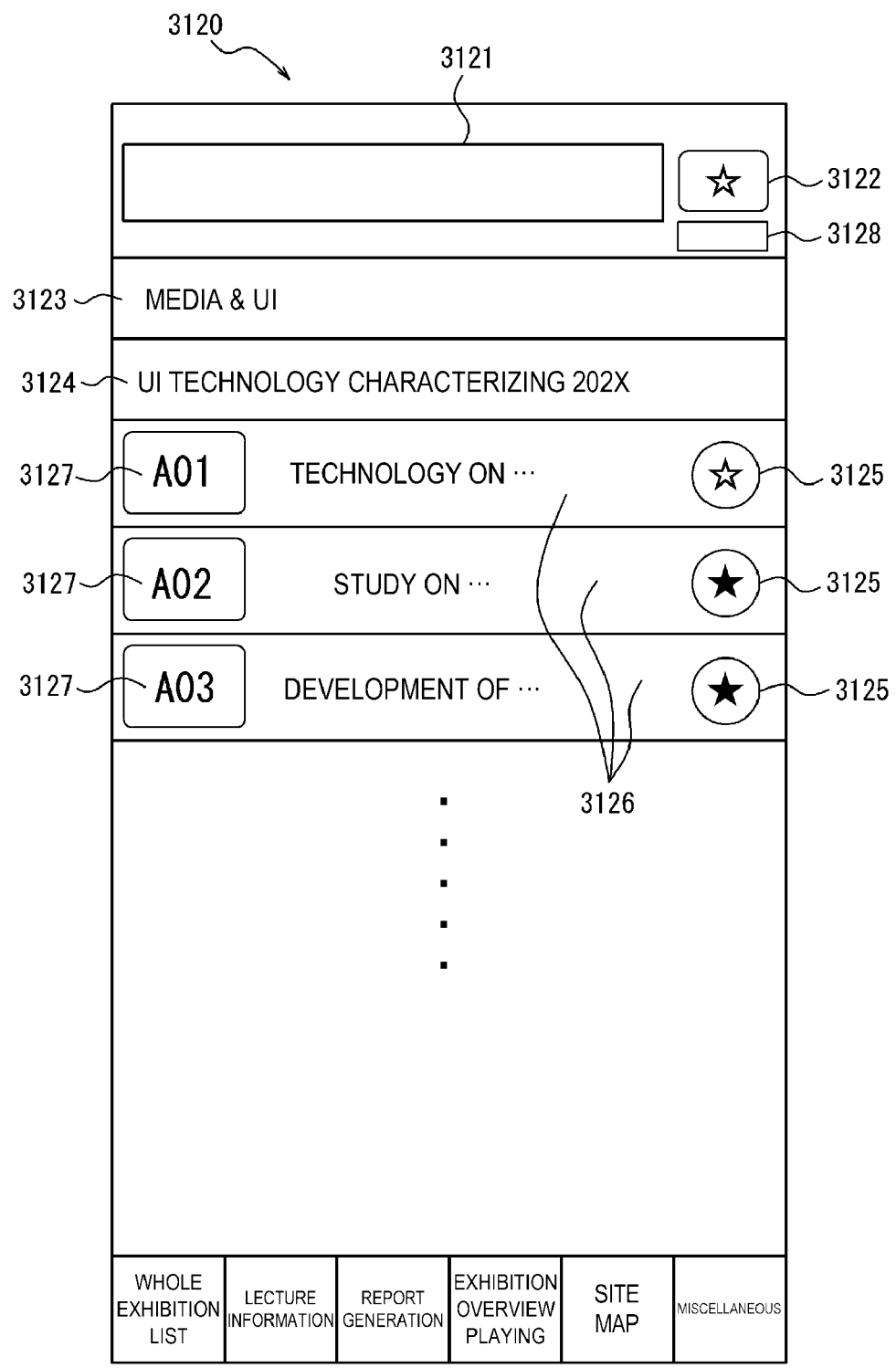
FIG. 6 is a diagram illustrating an example of a display screen of the display unit of the exhibition supporting device according to an embodiment of the present invention.

FIG. 6 is a diagram illustrating an example of the whole exhibition list screen 3120. As illustrated in FIG. 6, the whole exhibition list screen 3120 includes a search keyword input field 3121, a bookmark narrowing designation button 3122, a display category display section 3123, a display sub-category display section 3124, a bookmark registration button 3125, a display title button 3126, a display number display section 3127, an enter button 3128, and the like.

Figure 7:
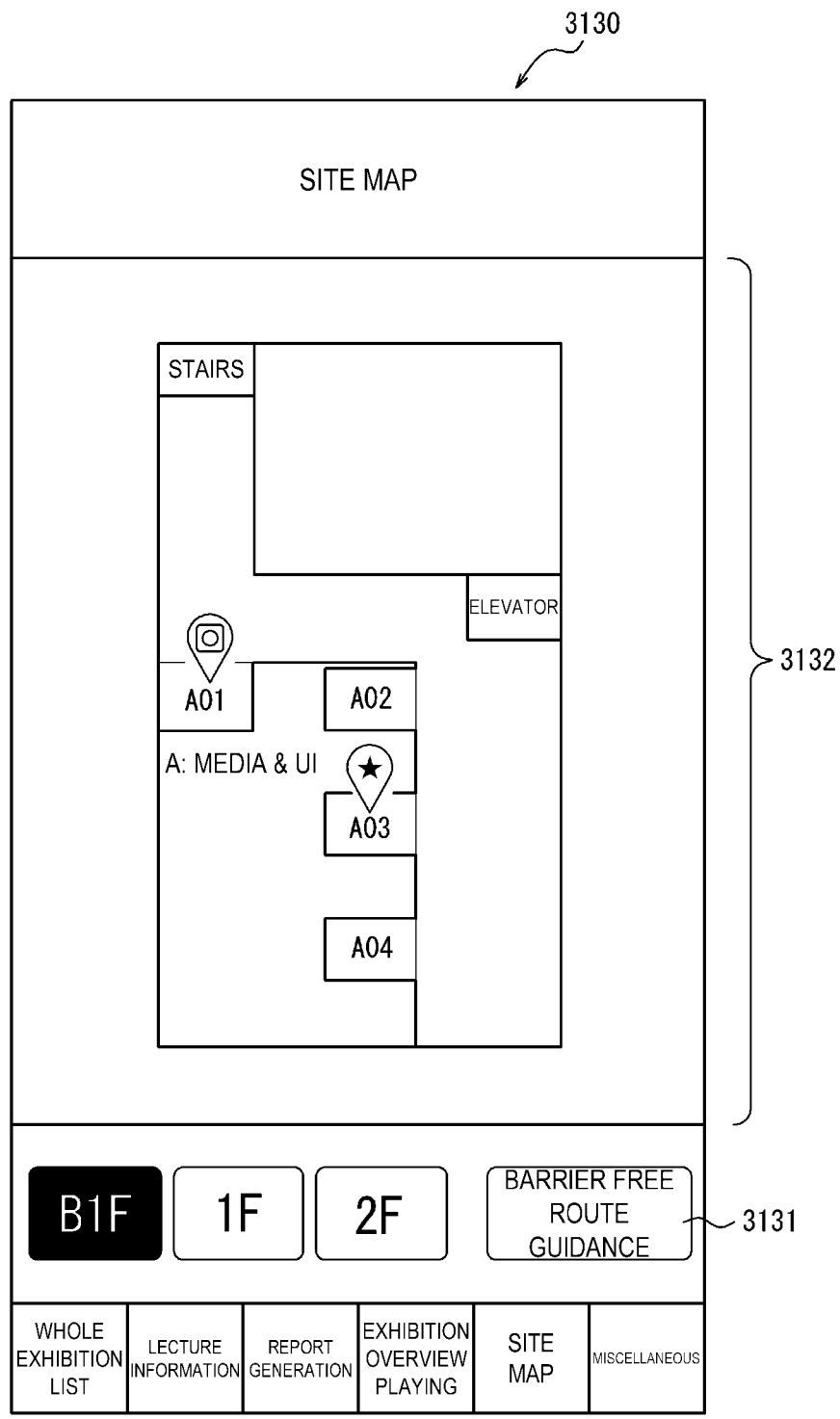
FIG. 7 is a diagram illustrating an example of a display screen of the display unit of the exhibition supporting device according to an embodiment of the present invention.

FIG. 7 is a diagram illustrating an example of the site map screen 3130. As illustrated in FIG. 7, the site map screen 3130 includes a barrier free route guidance button 3131, a site map display section 3132, and the like.

Figure 8:
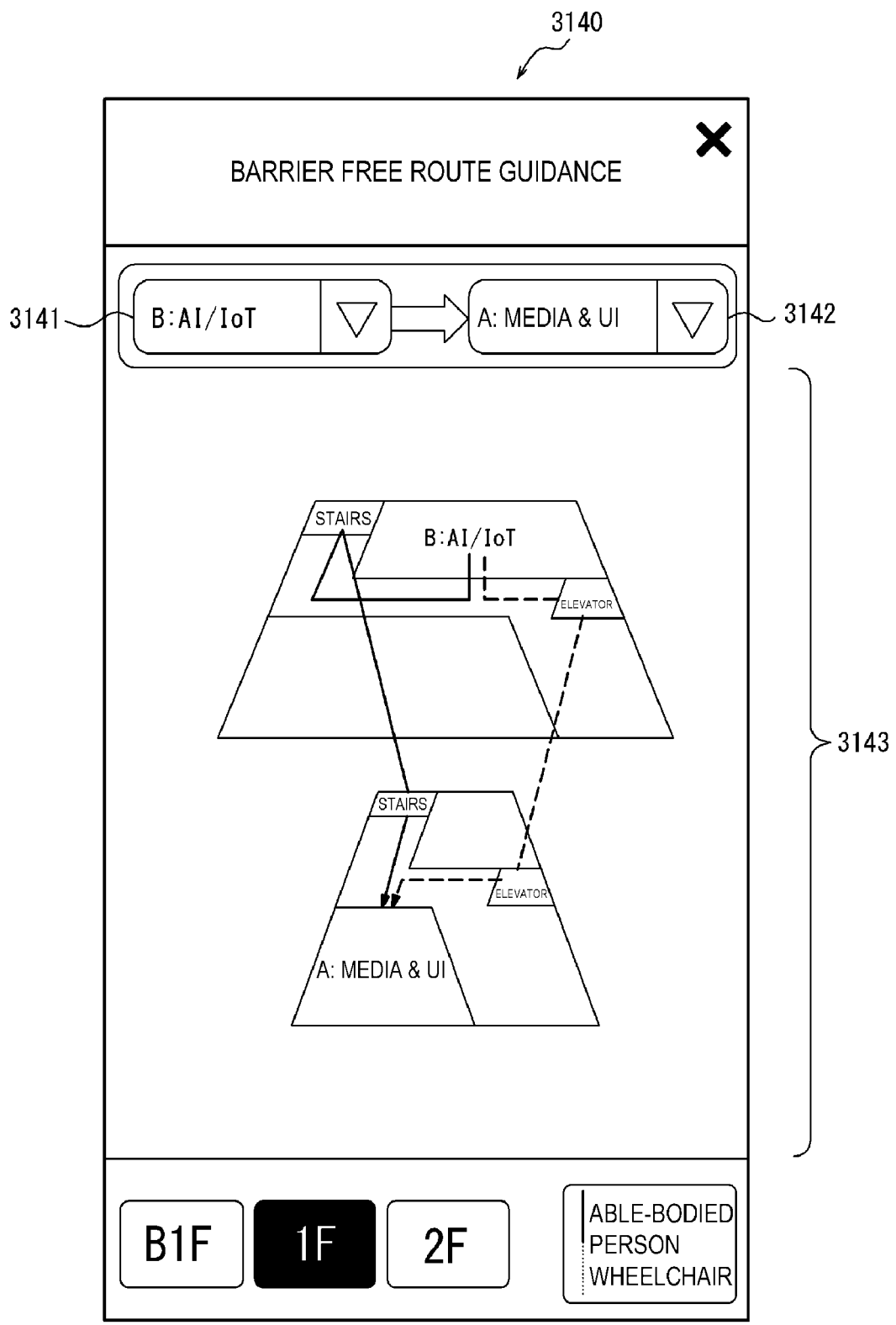
FIG. 8 is a diagram illustrating an example of a display screen of the display unit of the exhibition supporting device according to an embodiment of the present invention.

FIG. 8 is a diagram illustrating an example of the barrier free route guidance screen 3140. As illustrated in FIG. 8, the barrier free route guidance screen 3140 includes a current position selection field 3141, a destination selection field 3142, a barrier free route display section 3143, and the like.

Figure 9A:
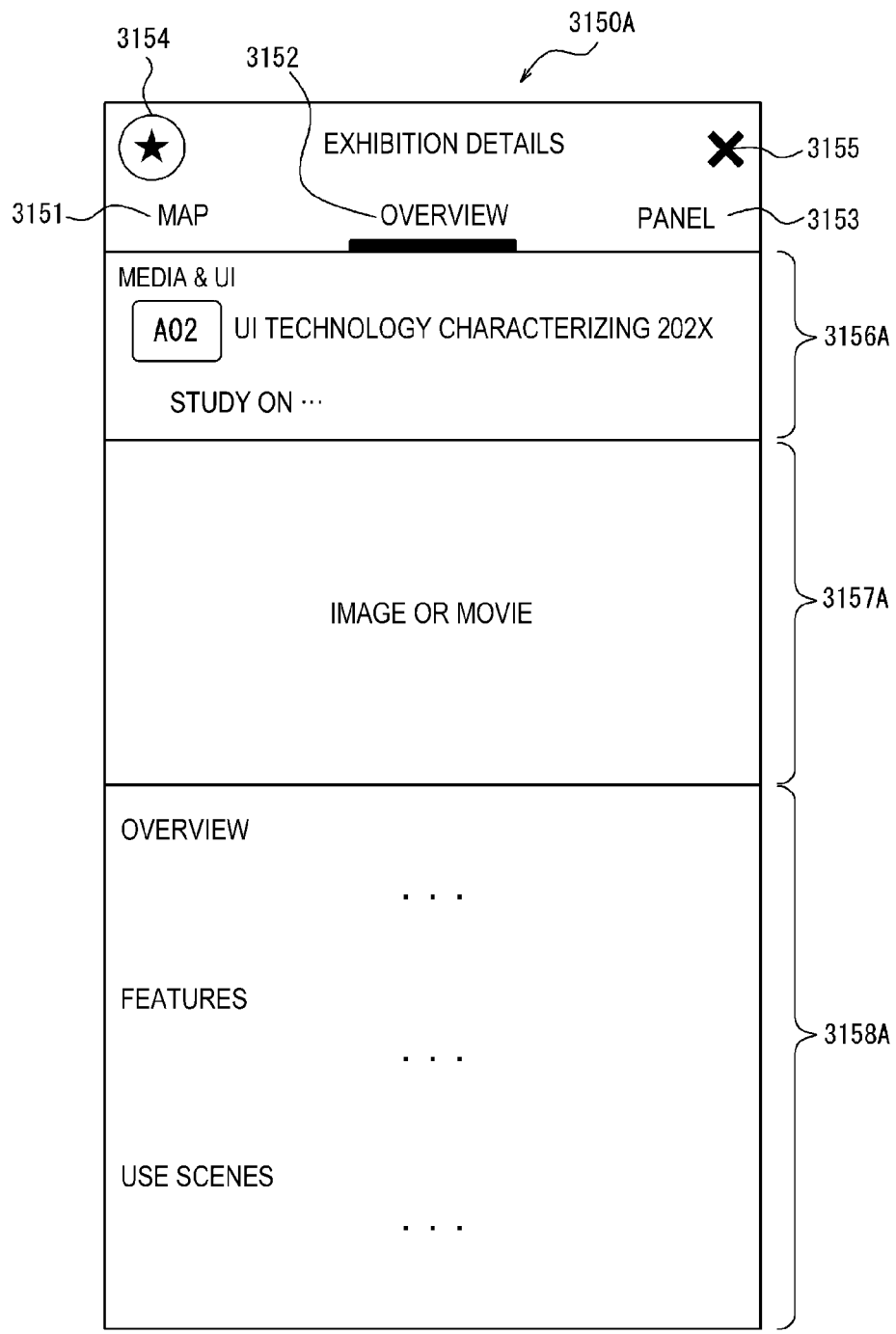
FIG. 9A is a diagram illustrating an example of a display screen of the display unit of the exhibition supporting device according to an embodiment of the present invention.
Figure 9B:
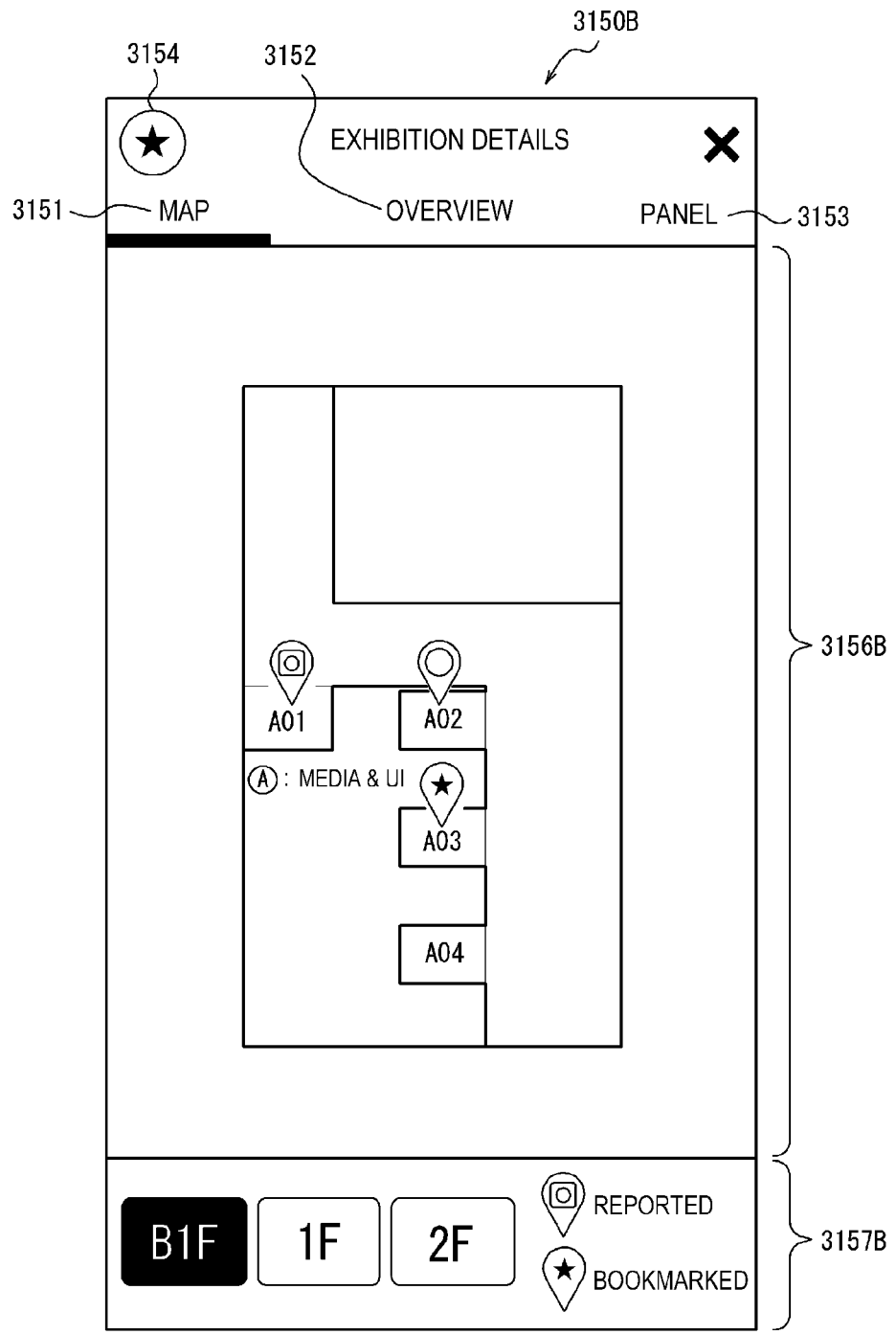
FIG. 9B is a diagram illustrating an example of a display screen of the display unit of the exhibition supporting device according to an embodiment of the present invention.
Figure 9C:
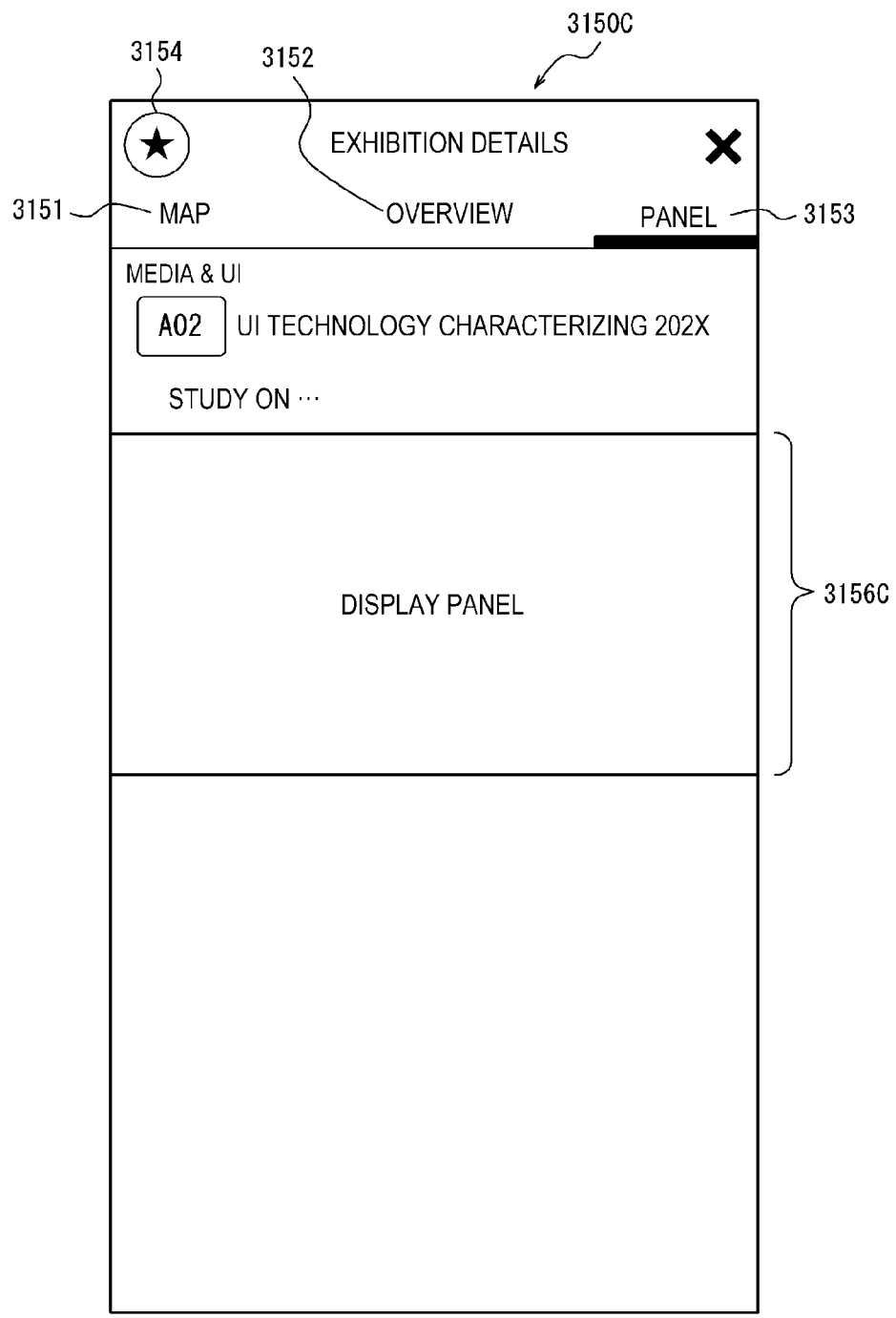
FIG. 9C is a diagram illustrating an example of a display screen of the display unit of the exhibition supporting device according to an embodiment of the present invention.

FIG. 9A is a diagram illustrating an example of the exhibition detail overview screen 3150A. FIG. 9B is a diagram illustrating an example of the exhibition detail map screen 3150B. FIG. 9C is a diagram illustrating an example of the exhibition detail panel screen 3150C. As illustrated in FIGS. 9A to 9C, the exhibition detail screens 3150 include a map display tab 3151, an overview display tab 3152, a panel display tab 3153, a bookmark registration button 3154, a close button 3155, a display section 3156A, a display section 3157A, a display section 3158A, a display section 3156B, a display section 3157B, and a display section 3156C. Note that the bookmark registration button 3125 of the whole exhibition list screen 3120 interfaces with the bookmark registration button 3154 on each of the exhibition detail overview screen 3150A, the exhibition detail map screen 3150B, and the exhibition detail panel screen 3150C.

Figure 10:
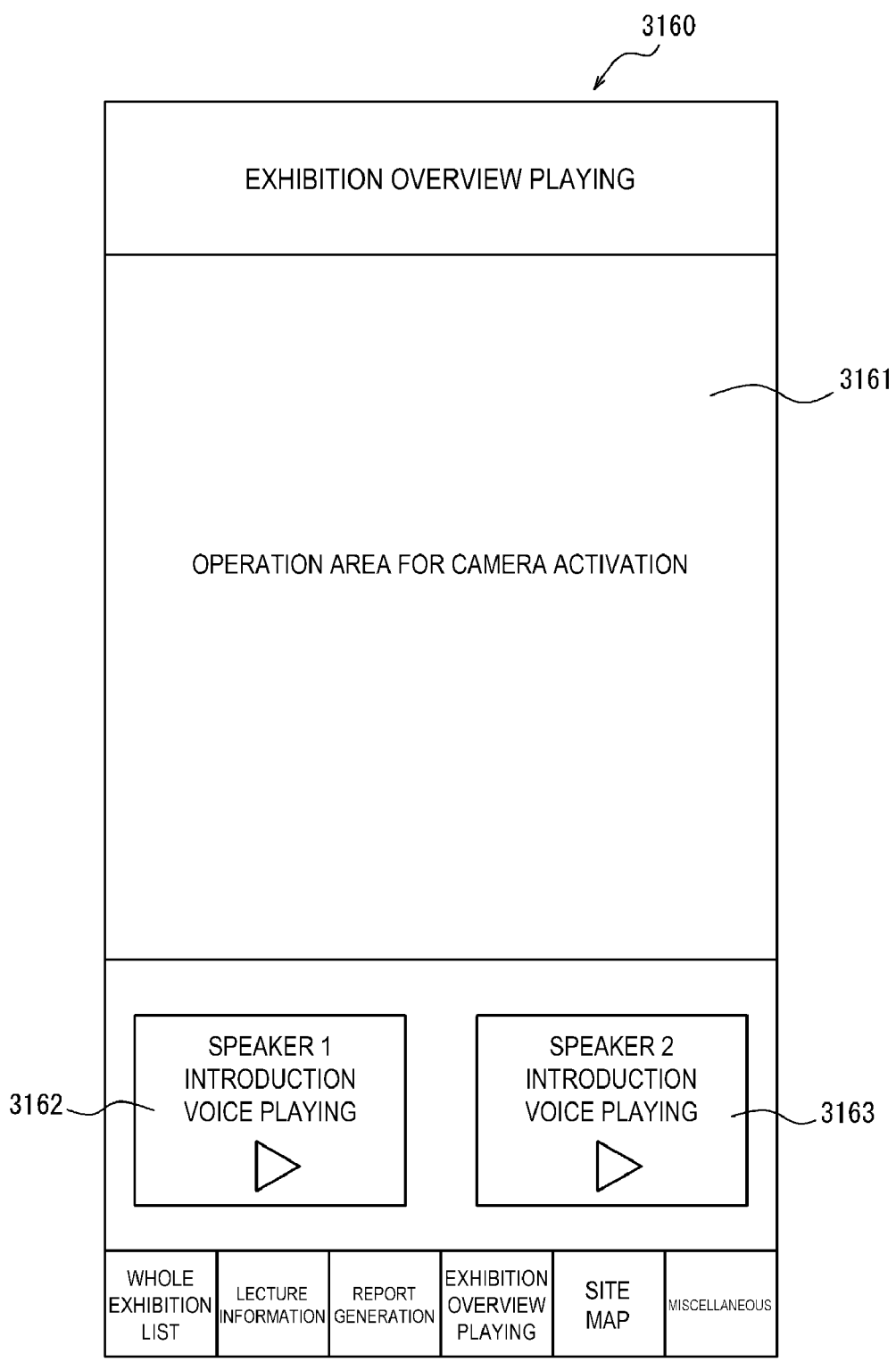
FIG. 10 is a diagram illustrating an example of a display screen of the display unit of the exhibition supporting device according to an embodiment of the present invention.

FIG. 10 is a diagram illustrating an example of the speaker introduction voice playing screen 3160. As illustrated in FIG. 10, the speaker introduction voice playing screen 3160 includes an operation area 3161 for camera activation, a speaker 1 introduction voice playing button 3162, a speaker 2 introduction voice playing button 3163, and the like.

Figure 11:
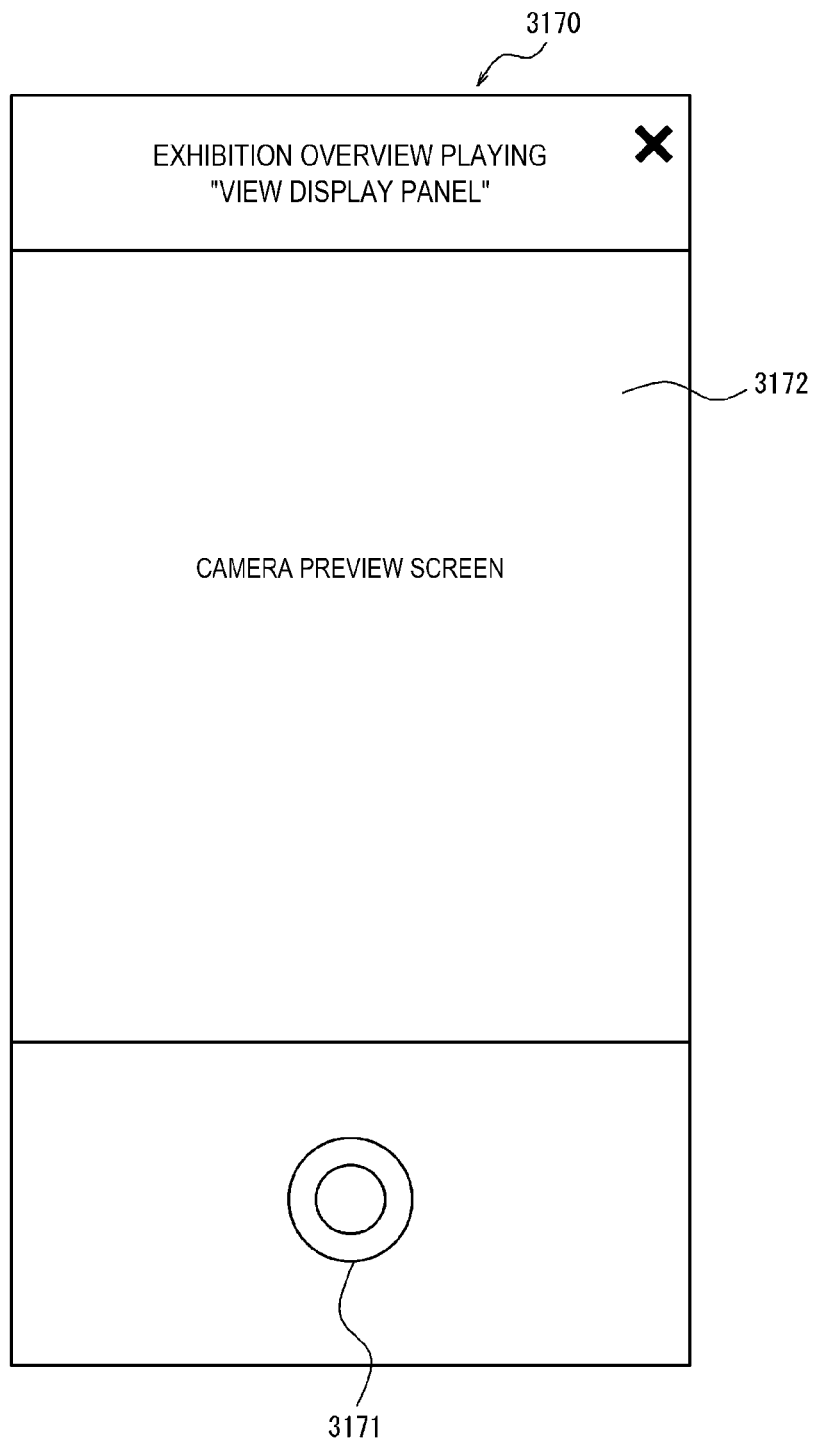
FIG. 11 is a diagram illustrating an example of a display screen of the display unit of the exhibition supporting device according to an embodiment of the present invention.

FIG. 11 is a diagram illustrating an example of the shooting screen 3170. As illustrated in FIG. 11, the shooting screen 3170 includes a shutter button 3171, a camera preview screen 3172, and the like.

Figure 12:
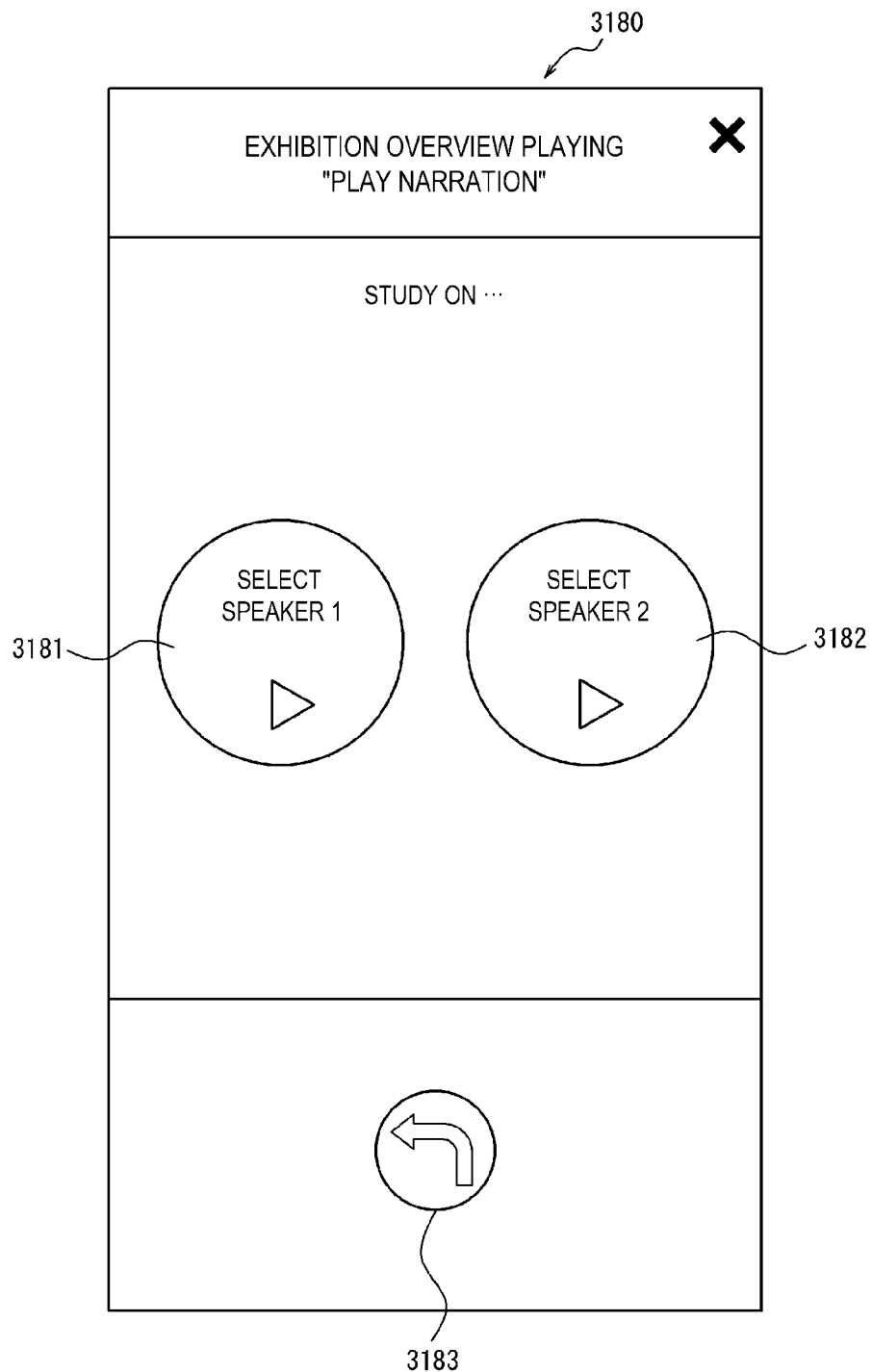
FIG. 12 is a diagram illustrating an example of a display screen of the display unit of the exhibition supporting device according to an embodiment of the present invention.

FIG. 12 is a diagram illustrating an example of the speaker selection screen 3180. As illustrated in FIG. 12, the speaker selection screen 3180 includes a speaker 1 selection button 3181, a speaker 2 selection button 3182, a back button 3183, and the like.

Figure 13:
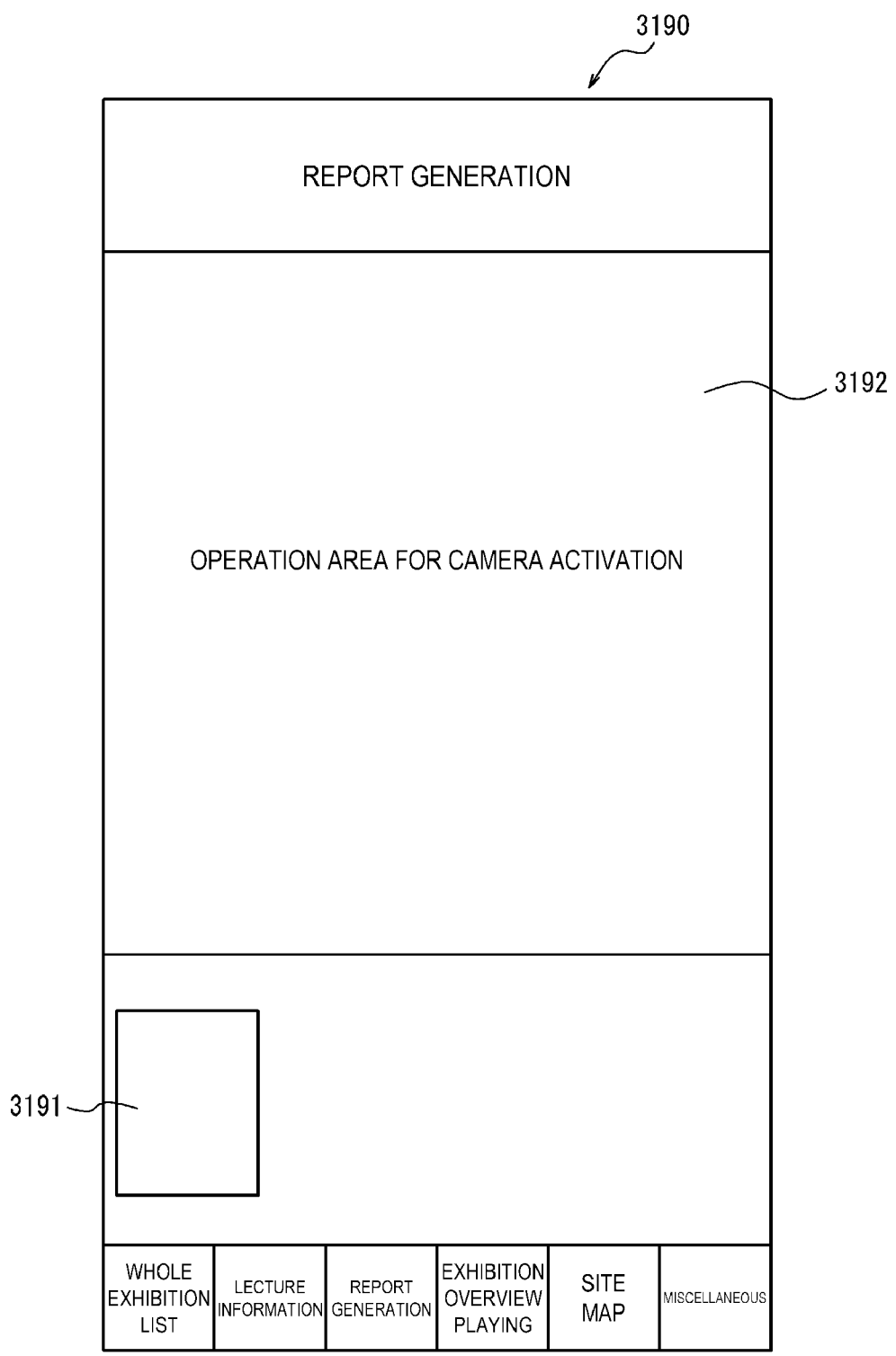
FIG. 13 is a diagram illustrating an example of a display screen of the display unit of the exhibition supporting device according to an embodiment of the present invention.

FIG. 13 is a diagram illustrating an example of the report generation screen 3190. As illustrated in FIG. 13, the report generation screen 3190 includes a generated report thumbnail button 3191, an operation area 3192 for camera activation, and the like.

Figure 14A:
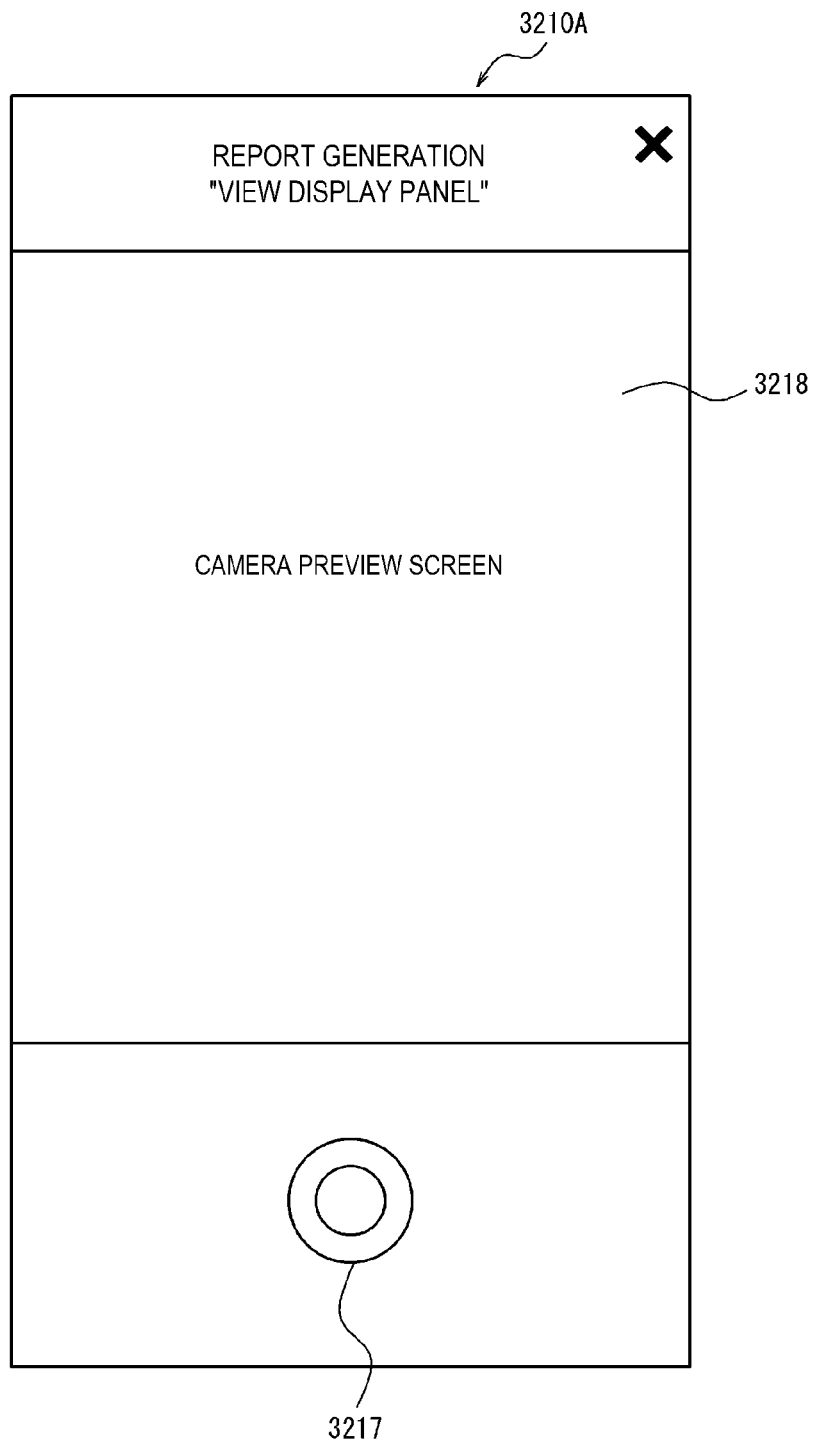
FIG. 14A is a diagram illustrating an example of a display screen of the display unit of the exhibition supporting device according to an embodiment of the present invention.
Figure 14B:
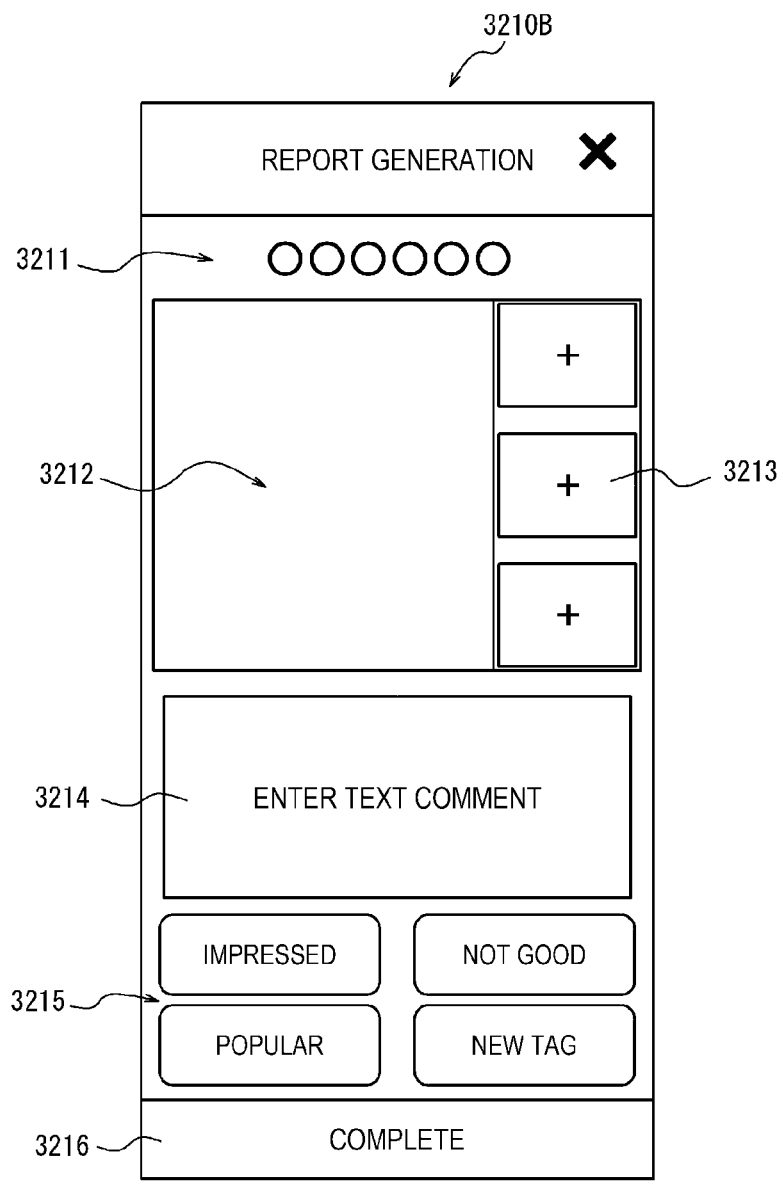
FIG. 14B is a diagram illustrating an example of a display screen of the display unit of the exhibition supporting device according to an embodiment of the present invention.

FIG. 14A is a diagram illustrating an example of the shooting screen 3210A. FIG. 14B is a diagram illustrating an example of the report input screen 3210B. As illustrated in FIGS. 14A and 14B, the shooting screen 3210A includes a shutter button 3217, a camera preview screen 3218, and the like. The report input screen 3210B includes a display section 3211, a display section 3212, an additional shooting button 3213, a text comment input field 3214, a tag selection button 3215, a complete button 3216, and the like.

Figure 15:
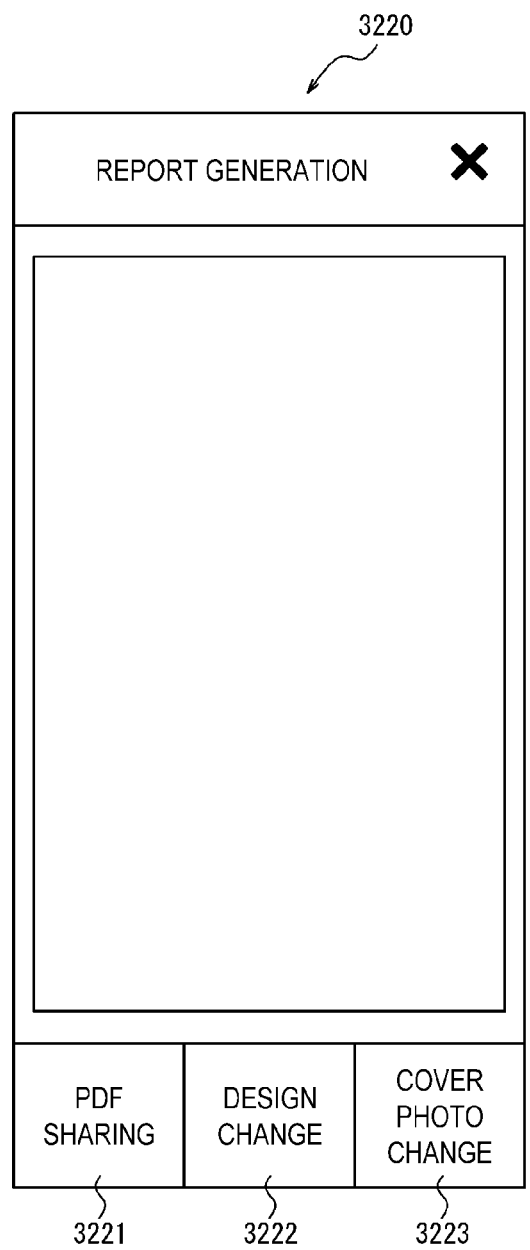
FIG. 15 is a diagram illustrating an example of a display screen of the display unit of the exhibition supporting device according to an embodiment of the present invention.

FIG. 15 is a diagram illustrating an example of the report display screen 3220. As illustrated in FIG. 15, the report display screen 3220 includes a PDF share button 3221, a design change button 3222, a cover photo change button 3223, and the like.

Figure 16:
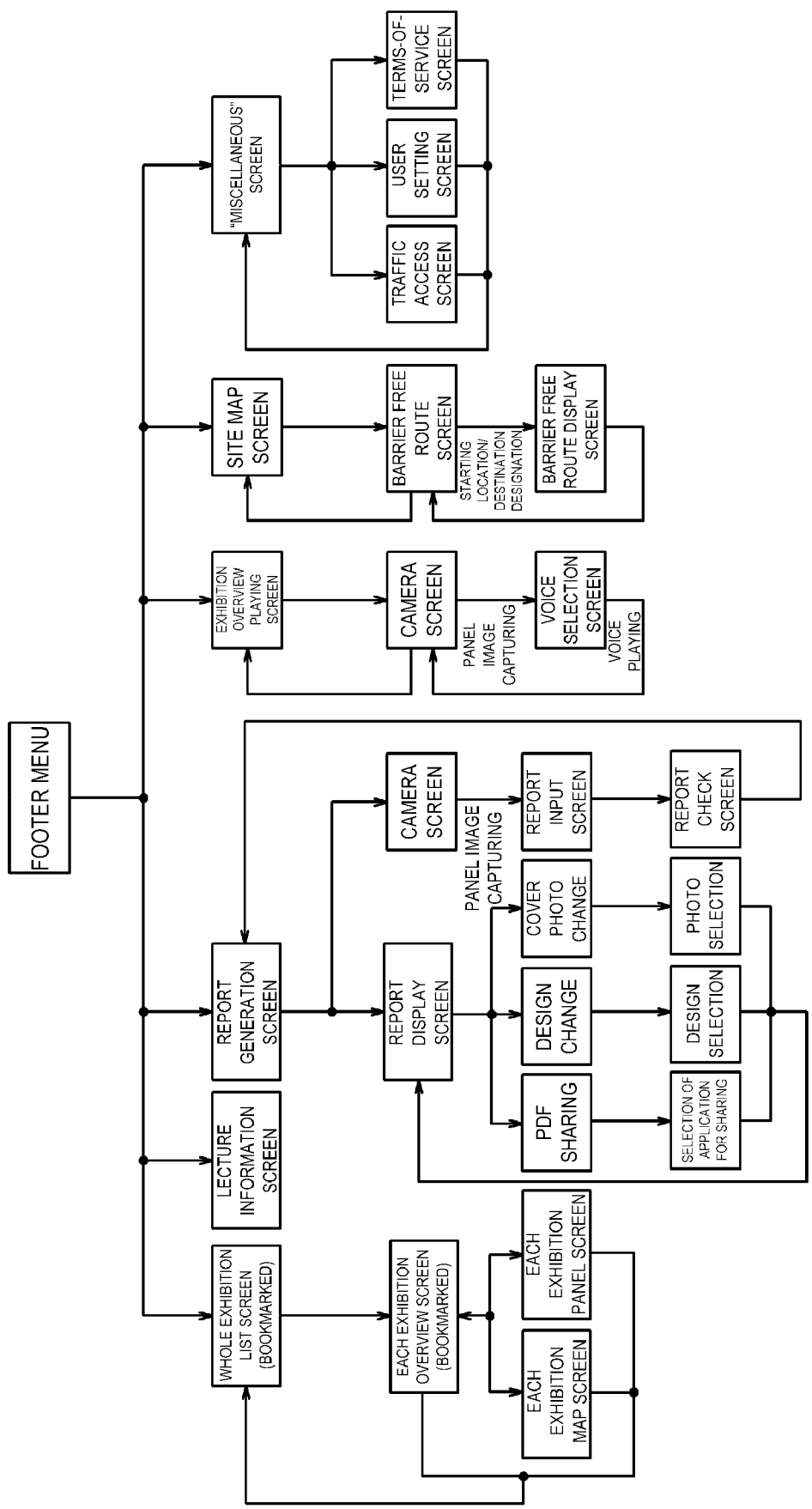
FIG. 16 is a diagram illustrating an example of a footer menu displayed on the display unit of the exhibition supporting device according to an embodiment of the present invention.

FIG. 16 is a diagram illustrating an example of the footer menu A. The user taps a button in the footer menu A, so that the screen displayed on the display unit 114 transitions from the initial screen 3110 illustrated in FIG. 5 to the corresponding display screen of the display screens illustrated in FIGS. 5 to 15. When the user taps a button in the footer menu A, the color of the corresponding button changes. In this way, the user can recognize the button he or she has tapped even after the screen displayed on the display unit 114 transitions from the initial screen 3110 illustrated in FIG. 5 to any of the display screens illustrated in FIGS. 5 to 15.

Hereinafter, by associating the display screens illustrated in FIGS. 5 to 15 and the corresponding footer menu A illustrated in FIG. 16 with each other, details of each of the display screens will be described.

As illustrated in FIGS. 6 and 16, when the user taps the whole exhibition list button 3111 on the initial screen 3110, the screen displayed on the display unit 114 transitions from the initial screen 3110 to the whole exhibition list screen 3120. On the whole exhibition list screen 3120, the display category display section 3123 displays the categories of display items, such as, for example, "media & UI". On the whole exhibition list screen 3120, the display sub-category display section 3124 displays a sub-category of display items, such as, for example, "UI technology characterizing 202X". On the whole exhibition list screen 3120, the display number display section 3127 displays display numbers of display items such as "A01", "A02", "A03", for example.

When the user enters a search keyword on, for example, a display item name, a display item overview, and the like in the search keyword input field 3121 on the whole exhibition list screen 3120 and then taps the enter button 3128, the text information related to the search keyword is retrieved and the display item that matches the search keyword is extracted. The display unit 114 displays detail exhibition information such as, for example, "Display No. A01, Display title: Technology on . . . ", "Display No. A02, Display title: Study on . . . ", "Display No. A03, Display title: Development of . . . ", and the like.

When the user taps the bookmark narrowing designation button 3122 on the whole exhibition list screen 3120, a bookmarked display item is narrowed down and designated, and the display item bookmarked by the user through the bookmark registration operation is extracted. The display unit 114 displays the display item bookmark registration information such as, for example, "Display No. A02, Display title: Study on . . . ", "Display No. A03, Display title: Development of . . . ", and the like.

The user can tap the bookmark registration button 3125 on the whole exhibition list screen 3120 to enable the bookmark registration operation of a display item or a bookmark deregistration operation of a display item. If the user does not intend to register the display item of "Display No. A01", for example, the user taps the bookmark registration button 3125 so that the bookmark registration button 3125 becomes a white star. If the user intends to register the display item of "Display No. A02", for example, the user taps the bookmark registration button 3125 so that the bookmark registration button 3125 becomes a black star. If the user intends to register the display item of "Display No. A03", for example, the user taps the bookmark registration button 3125 so that the bookmark registration button 3125 becomes a black star. Note that the terminal device 110 may be configured in such a manner that black and white stars indicate opposite to what are described above.

As illustrated in FIGS. 9A and 16, when the user taps the display title button 3126 of the display item he or she is interested in on the whole exhibition list screen 3120, the screen displayed on the display unit 114 transitions from the initial screen 3110 to the exhibition detail overview screen 3150A. On the exhibition detail overview screen 3150A, the display section 3156A displays, for example, a display item category, a display item display number, a display item sub-category, a display title, and the like. On the exhibition detail overview screen 3150A, the display section 3157A displays, for example, a display item image, a display item movie, and the like. On the exhibition detail overview screen 3150A, the display section 3158A displays, for example, an exhibition overview, exhibition features, exhibition use scenes, and the like. Once the user taps the close button 3155, the screen displayed on the display unit 114 returns again to the whole exhibition list screen 3120.

When the user selects the display item of, for example, "Display No. A01" on the whole exhibition list screen 3120, the screen displayed on the display unit 114 transitions from the whole exhibition list screen 3120 to the exhibition detail overview screen 3150A indicating details of the display item of "Display No. A01, Display title: Technology on . . . ". When the user selects the display item of, for example, "Display No. A02" on the whole exhibition list screen 3120, the screen displayed on the display unit 114 transitions from the whole exhibition list screen 3120 to the exhibition detail overview screen 3150A indicating details of the display item of "Display No. A02, Display Title: Study on . . . ". When the user selects the display item of, for example, "Display No. A03" on the whole exhibition list screen 3120, the screen displayed on the display unit 114 transitions from the whole exhibition list screen 3120 to the exhibition detail overview screen 3150A indicating details of the display item of "Display No. A03, Display Title: Development of . . . ". Note that by the user flicking or swiping the display title, the display list is scrolled on the whole exhibition list screen 3120.

As illustrated in FIGS. 9B and 16, when the user taps the map display tab 3151 on the exhibition detail overview screen 3150A, the screen displayed on the display unit 114 transitions from the exhibition detail overview screen 3150A to the exhibition detail map screen 3150B, and when the user taps the overview display tab 3152, the screen displayed on the display unit 114 returns from the exhibition detail map screen 3150B to the exhibition detail overview screen 3150A. On the exhibition detail map screen 3150B, the display section 3156B displays the location of the checked display item superimposed on the floor map, so that the location of the checked display item is clearly known to the user. On the exhibition detail map screen 3150B, the display section 3157B displays a floor number indicating a floor of the exhibition site, a camera mark icon indicating a display item on which a report has been generated, a star icon indicating a display item that has been bookmarked, and the like. For example, in a case where the floor map displayed on a display section 346 is a floor map of the first basement, B1F is displayed in black, and 1F indicating the first floor and 2F indicating the second floor are displayed in white. Once the user taps the close button 3155, the screen displayed on the display unit 114 returns again to the whole exhibition list screen 3120.

As illustrated in FIGS. 9C and 16, when the user taps the panel display tab 3153 on the exhibition detail overview screen 3150A, the screen displayed on the display unit 114 transitions from the exhibition detail overview screen 3150A to the exhibition detail panel screen 3150C, and when the user taps the overview display tab 3152, the screen displayed on the display unit 114 returns from the exhibition detail panel screen 3150C to the exhibition detail overview screen 3150A. On the exhibition detail panel screen 3150C, the display section 3156C displays, for example, a display item panel and the like. Once the user taps the close button 3155, the screen displayed on the display unit 114 returns again to the whole exhibition list screen 3120.

As illustrated in FIG. 16, when the user taps the lecture information button 3112 on the initial screen 3110, the screen displayed on the display unit 114 transitions to the lecture information screen.

As illustrated in FIGS. 13 and 16, when the user taps the report generation button 3113 on the initial screen 3110, the screen displayed on the display unit 114 transitions from the initial screen 3110 to the report generation screen 3190.

As illustrated in FIGS. 15 and 16, when the user taps the generated report thumbnail button 3191 on the report generation screen 3190, the screen displayed on the display unit 114 transitions from the report generation screen 3190 to the report display screen 3220. The user can check the report generated by the user on the report display screen 3220.

When the user taps the PDF share button 3221 on the report display screen 3220, the report HTML information is converted to PDF file information to allow information sharing with others using mail or other applications. When the user taps the design change button 3222 on the report display screen 3220, the design on each page of the generated report can be changed. The user can select a favorite design among the designs displayed on the display unit 114. When the user taps the cover photo change button 3223 on the report display screen 3220, the cover photograph on the cover of the generated report can be changed. The user can select a favorite cover photo among the cover photos displayed on the display unit 114. Once the user has finished the cover photo change operation, the screen displayed on the display unit 114 returns again to the report display screen 3220.

As illustrated in FIGS. 14A and 16, when the user performs a predetermined operation in the operation area 3192 for camera activation on the report generation screen 3190, the screen displayed on the display unit 114 transitions from the report generation screen 3190 to the shooting screen 3210A.

As illustrated in FIGS. 14B and 16, when the user taps the shutter button 3217 while viewing the camera preview screen 3218 on the shooting screen 3210A, an image of the display item is captured and then the screen displayed on the display unit 114 transitions from the shooting screen 3210A to the report input screen 3210B. On the report input screen 3210B, the display section 3211 displays, for example, a display item category, a display item display number, a display item sub-category, a display title, and the like. On the report input screen 3210B, the display section 3212 displays, for example, a display item image, a display item movie, and the like. Note that the terminal device 110 may recognize, as the display item image information, an image automatically captured by directing the camera toward the display item without requiring the user to press the shutter button 3217.

When the user taps the additional shooting button 3213 on the report input screen 3210B, the screen displayed on the display unit 114 transitions from the report input screen 3210B to the shooting screen 3210A. When the user taps the shutter button 3217 while viewing the camera preview screen 3218 on the shooting screen 3210A, an image of the display item is captured again.

When the user enters a text comment in the text comment input field 3214 and taps the complete button 3216 on the report input screen 3210B, the text comment is added to the report.

When the user taps the tag selection button 3215 on the report input screen 3210B, a predetermined tag is added to the report. The tag may be preset in the terminal device 110, or the user may newly set the tag using the terminal device 110.

As illustrated in FIG. 16, when the user completes the input operation and taps the complete button 3216 on the report input screen 3210B, the screen displayed on the display unit 114 transitions from the report input screen 3210B to a report check screen, and then returns again to the report generation screen 3190.

As illustrated in FIGS. 10 and 16, when the user taps the exhibition overview playing button 3114 on the initial screen 3110, the screen displayed on display unit 114 transitions from the initial screen 3110 to the speaker introduction voice playing screen 3160. When the user taps the speaker 1 introduction voice playing button 3162 on the speaker introduction voice playing screen 3160, voice introducing the speaker 1 is played. When the user taps the speaker 2 introduction voice playing button 3163 on the speaker introduction voice playing screen 3160, voice introducing the speaker 2 is played.

As illustrated in FIGS. 11 and 16, when the user performs a predetermined operation in the operation area 3161 for camera activation on the speaker introduction voice playing screen 3160, the screen displayed on the display unit 114 transitions from the speaker introduction voice playing screen 3160 to the shooting screen 3170.

As illustrated in FIGS. 12 and 16, when the user taps the shutter button 3171 while viewing the camera preview screen 3172 on the shooting screen 3170, an image of the display item is captured and the screen displayed on the display unit 114 transitions from the shooting screen 3170 to the speaker selection screen 3180. Note that the terminal device 110 may recognize, as the display item image information, an image automatically captured by directing the camera toward the display item without requiring the user to press the shutter button 3171.

When the user taps the speaker 1 selection button 3181 on the speaker selection screen 3180, an exhibition overview of a display item in accordance with the recognition result information is played in the synthesized voice of the speaker 1. When the user taps the speaker 2 selection button 3182 on the speaker selection screen 3180, an exhibition overview of a display item in accordance with the recognition result information is played in the synthesized voice of the speaker 2. The user can optionally select the speaker with the speaker selection buttons. When the user taps the back button 3183 on the speaker selection screen 3180, the screen displayed on the display unit 114 returns again to the shooting screen 3170.

As illustrated in FIGS. 7 and 16, when the user taps the site map button 3115 on the initial screen 3110, the screen displayed on the display unit 114 transitions from the initial screen 3110 to the site map screen 3130.

As illustrated in FIGS. 8 and 16, when the user taps the barrier free route guidance button 3131 on the site map screen 3130, the screen displayed on the display unit 114 transitions from the site map screen 3130 to the barrier free route guidance screen 3140. When the user enters the name of a display item currently visited (AI/IoT, for example) in the current position selection field 3141 on the barrier free route guidance screen 3140 and the name of a display item to be visited next (media & UI, for example) in the destination selection field 3142, the screen displayed on the display unit 114 transitions from the barrier free route guidance screen 3140 to the barrier free route display screen.

As illustrated in FIG. 16, when the user taps the miscellaneous button 3116 on the initial screen 3110, the screen displayed on display unit 114 transitions to a miscellaneous screen.

When the user taps a traffic access button, for example, on the miscellaneous screen, the screen displayed on the display unit 114 transitions from the miscellaneous screen to a traffic access screen. The traffic access screen includes, for example, means of transportation available to get to the exhibition site from the closest station to the exhibition site where the exhibition is held.

When the user taps a user setting button, for example, on the miscellaneous screen, the screen displayed on the display unit 114 transitions from the miscellaneous screen to a user setting screen. The user setting screen includes a user job setting field, for example, software-related, hardware-related, system integrator, telecommunications services, and the like, a user profession setting field, for example, planning, engineering, sales, clerical work, and the like, a user position setting field, for example, management, director, division manager, department manager, and the like.

When the user taps a terms-of-service button, for example, on the miscellaneous screen, the screen displayed on the display unit 114 transitions from the miscellaneous screen to a terms-of-service screen. The terms-of-service screen includes, for example, the content of the terms of service, select buttons for the user to select whether to agree on the terms of service, and the like.

As described above, with the exhibition supporting system 100 according to the present embodiment, the user can take various types of actions including, for example, "find display item", "go to displayed area", "listen to descriptions at exhibition booth", "create notes on display item", "share information after leaving exhibition", and the like, while checking the information he or she needs displayed on the screen of the terminal device 110. This can make the exhibition experience more engaging for the user.

In addition, with the exhibition supporting system 100 according to the present embodiment, appropriate information can be provided to the user without installing additional equipment to exhibition booths, so that the appearance of the display items can be maintained.

In addition, with the exhibition supporting system 100 according to the present embodiment, by making appropriate one of the terminal device 110 and the exhibition information server 120 be in charge of high load processing, abnormal termination of the terminal device 110 and the exhibition information server 120 can be prevented.

Note that a computer can be suitably used to function as the exhibition supporting device (terminal device) 110 described above. Such a computer can be implemented by storing a program describing the processing contents for achieving the functions of the exhibition supporting device 110 in a database of the computer and causing the CPU of this computer to read and execute the program.

The program may be recorded in a computer-readable medium. The program can be installed on a computer by using a computer-readable medium. Here, the computer-readable medium on which the program is recorded may be a non-transitory recording medium. The non-transitory recording medium is not limited to particular media, but may be, for example, a recording medium such as a CD-ROM or a DVD-ROM.

The above embodiments have been described as representative examples, but it is apparent to those skilled in the art that many changes and substitutions are possible without departing from the spirit and scope of the present invention. Therefore, the present invention should not be construed as being limited by the embodiments described above, and various modifications and changes can be made without departing from the scope of the claims. For example, a plurality of constituent blocks illustrated in a configuration diagram according to an embodiment may be combined into one block, or one constituent block may be divided.

REFERENCE SIGNS LIST

50 Network
100 Exhibition supporting system
110 Terminal device (Exhibition supporting device)
111 Communication unit
112 Control unit
113 Storage unit
114 Display unit
115 Operation unit
116 Voice playing unit
120 Exhibition information server
130 Database server
140 Image recognition server
150 Image recognition engine
160 Barrier free map server
1111 Image information acquisition unit
1112 Recognition result information acquisition unit
1113 User information acquisition unit
1114 Exhibition information acquisition unit
1115 Lecture information acquisition unit
1116 Barrier free information acquisition unit
1117 Edit information acquisition unit
1118 Voice information acquisition unit
1121 Report generation unit
1122 Voice information selection unit
1123 Terminal device side PDF generation unit
1221 Report HTML generation unit
1222 PDF generation determination unit
1223 Exhibition information server side PDF generation unit
1231 Lecture information accumulation unit
1232 Exhibition information accumulation unit
1233 Voice information accumulation unit

The invention claimed is:

1. An exhibition supporting device, comprising:
a recognition result information acquirer configured to acquire recognition result information on a display item in accordance with image information on the display item;
an exhibition information acquirer configured to acquire exhibition information for supporting an exhibition-related user action in accordance with the recognition result information and exhibition-related user information, wherein the exhibition-related user action comprising a set of predetermined operations that a user performs on a terminal device; and
a displayer configured to display the exhibition information.

2. The exhibition supporting device according to claim 1, further comprising:
a barrier free information acquirer configured to acquire barrier free information in accordance with starting location information and destination information.

3. The exhibition supporting device according to claim 1, further comprising:
a generator configured to generate report information on the exhibition in accordance with the exhibition information.

4. The exhibition supporting device according to claim 1, further comprising:
a voice player configured to play synthesized voice information on a predetermined speaker explaining an overview of the display item.

5. The exhibition supporting device according to claim 2, further comprising:
a generator configured to generate report information on the exhibition in accordance with the exhibition information.

6. The exhibition supporting device according to claim 2, further comprising:
a voice player configured to play synthesized voice information on a predetermined speaker explaining an overview of the display item.

7. The exhibition supporting device according to claim 3, further comprising:
a voice player configured to play synthesized voice information on a predetermined speaker explaining an overview of the display item.

8. An exhibition supporting system, comprising:
a processor; and
a memory storing computer-executable instructions that when executed by the processor cause the system to:
determine, by an image recognizer, recognition result information on a display item in accordance with image information on the display item;
generate, by an exhibition information generator, exhibition information for supporting an exhibition-related user action in accordance with the recognition result information and exhibition-related user information, wherein the exhibition-related user action comprising a set of predetermined operations that a user performs on a terminal device; and
display, by a terminal displayer, the exhibition information.

9. The exhibition supporting system according to claim 8, the computer-executable instructions that when executed by the processor further cause the system to:
generate, by a barrier free information generator, barrier free information in accordance with starting location information and destination information.

10. The exhibition supporting system according to claim 8, the computer-executable instructions that when executed by the processor further cause the system to:
generate, by a generator, report information on the exhibition in accordance with the exhibition information.

11. The exhibition supporting system according to claim 8, the computer-executable instructions that when executed by the processor further cause the system to:
play, by a voice player, synthesized voice information on a predetermined speaker explaining an overview of the display item.

12. The exhibition supporting system according to claim 9, the computer-executable instructions that when executed by the processor further cause the system to:
generate, by a generator, report information on the exhibition in accordance with the exhibition information.

13. The exhibition supporting system according to claim 9, the computer-executable instructions that when executed by the processor further cause the system to:
  play, by a voice player, synthesized voice information on a predetermined speaker explaining an overview of the display item.

14. An exhibition supporting method, comprising:
  acquiring, by a recognition result information acquirer, recognition result information on a display item in accordance with image information on the display item;
  acquiring, by an exhibition information acquirer, exhibition information for supporting an exhibition-related user action in accordance with the recognition result information and exhibition-related user information, wherein the exhibition-related user action comprising a set of predetermined operations that a user performs on a terminal device; and
  displaying, by a displayer, the exhibition information.

15. The exhibition support method according to claim 14, further comprising:
  generating, by a barrier free information generator, barrier free information in accordance with starting location information and destination information.

16. The exhibition support method according to claim 14, further comprising:
  generating, by a generator, report information on the exhibition in accordance with the exhibition information.

17. The exhibition support method according to claim 14, further comprising:
  playing, by a voice player, synthesized voice information on a predetermined speaker explaining an overview of the display item.

18. The exhibition support method according to claim 15, further comprising:
  generating, by a generator, report information on the exhibition in accordance with the exhibition information.

19. The exhibition support method according to claim 15, further comprising:
  playing, by a voice player, synthesized voice information on a predetermined speaker explaining an overview of the display item.

* * * * *